(12) United States Patent
Tsudo et al.

(10) Patent No.: US 8,912,281 B2
(45) Date of Patent: Dec. 16, 2014

(54) URETHANE RESIN PARTICLES FOR SLUSH MOLDING

(75) Inventors: Yasuhiro Tsudo, Kyoto (JP); Masaki Inaba, Kyoto (JP); Koichi Saito, Kyoto (JP); Hideaki Saito, Kyoto (JP); Takanori Yamamoto, Kyoto (JP)

(73) Assignee: Sanyo Chemical Industries, Ltd., Kyoto-shi (JP)

( * ) Notice: Subject to any disclaimer, the term of this patent is extended or adjusted under 35 U.S.C. 154(b) by 192 days.

(21) Appl. No.: 13/514,190

(22) PCT Filed: Dec. 9, 2010

(86) PCT No.: PCT/JP2010/007160
§ 371 (c)(1),
(2), (4) Date: Jun. 6, 2012

(87) PCT Pub. No.: WO2011/070784
PCT Pub. Date: Jun. 16, 2011

(65) Prior Publication Data
US 2012/0245281 A1    Sep. 27, 2012

(30) Foreign Application Priority Data

| Dec. 10, 2009 | (JP) | 2009-280295 |
| Mar. 11, 2010 | (JP) | 2010-054045 |
| Mar. 18, 2010 | (JP) | 2010-062290 |
| Mar. 26, 2010 | (JP) | 2010-071196 |
| Jul. 6, 2010  | (JP) | 2010-153980 |
| Oct. 12, 2010 | (JP) | 2010-229743 |

(51) Int. Cl.
| C08G 18/08 | (2006.01) |
| B29C 41/18 | (2006.01) |
| C08J 3/20  | (2006.01) |
| C08G 18/73 | (2006.01) |
| C08G 18/10 | (2006.01) |
| C08G 18/12 | (2006.01) |
| C08G 18/42 | (2006.01) |
| B29K 75/00 | (2006.01) |

(52) U.S. Cl.
CPC . B29C 41/18 (2013.01); C08J 3/20 (2013.01); C08G 18/73 (2013.01); C08G 18/10 (2013.01); C08G 18/12 (2013.01); C08G 18/42 (2013.01); B29K 2075/00 (2013.01); C08J 2375/00 (2013.01)

USPC ......... 524/839; 524/589; 524/590; 524/840; 524/871; 524/873; 524/874; 524/875

(58) Field of Classification Search
USPC ......... 524/589, 590, 839, 840, 871, 873, 874, 524/875
See application file for complete search history.

(56) References Cited

U.S. PATENT DOCUMENTS

| 7,122,250 B2 * | 10/2006 | Kinsho et al. .............. 428/407 |
| 2005/0031871 A1 * | 2/2005 | Kinsho et al. .............. 428/402 |
| 2005/0165139 A1 * | 7/2005 | Kawakami et al. ............ 524/17 |
| 2006/0165989 A1 * | 7/2006 | Takikawa et al. .......... 428/402.2 |

FOREIGN PATENT DOCUMENTS

| JP | 08-120041 A | 5/1996 |
| JP | 11-049948 A | 2/1999 |
| JP | 2005-097901 A1 | 10/2005 |
| JP | 2007-204693 A | 8/2007 |
| JP | 2009-067853 A | 4/2009 |
| JP | 2009-091519 A | 4/2009 |
| JP | 2009-221293 A | 10/2009 |

OTHER PUBLICATIONS

International Search Report of PCT/JP2010/007160, mailing date of Mar. 15, 2011.

* cited by examiner

*Primary Examiner* — Michael L Leonard
(74) *Attorney, Agent, or Firm* — Westerman, Hattori, Daniels & Adrian, LLP

(57) ABSTRACT

Provided are urethane resin particles for slush molding which make it possible that inconveniences based on the slip-down of a pigment, on the aggregation of particles of the pigment, and on other causes are removed although this coloring is coloring onto the resin particle surfaces. The present invention is urethane resin particles for slush mold which contain a urethane resin and an additive, wherein the particles have a shape factor SF1 of 101 to 200, a shape factor SF2 of 120 to 240, and a central particle diameter of 20 to 500 μm. It is preferred that the urethane resin has a concentration of urea groups of 0.5 to 10% by weight, a total of the concentration of urethane groups and that of the urea groups of 4 to 20% by weight, a melting point of 160 to 260° C. and a glass transition temperature of −65 to 0° C.

7 Claims, No Drawings

URETHANE RESIN PARTICLES FOR SLUSH MOLDING

TECHNICAL FIELD

The present invention relates to urethane resin particles for slush molding having irregular surfaces.

BACKGROUND ART

In recent years, a slush molding method has widely been used for interior materials and the like of automobiles, since the molding makes it possible to mold easily into a product having a complicated form (such as an undercut or deep drawn form) and give an even wall thickness, and makes the yield percentage of the raw material good. Conventionally, in many cases, slush molding powdery products of a vinyl chloride-based resin have been used as skin materials of automobile interior components such as an instrument panel and a door trim.

However, when a vinyl chloride-based material is used over along term, a plasticizer contained therein shifts to the surface thereof in accordance with a use environment thereof, so that the material is damaged in soft feeling. When an automobile is disposed and then subjected to incineration treatment, hydrogen chloride gas is generated in accordance with the incineration temperature, so that the incineration furnace may be corroded in some cases.

In order to solve these problems, developments are being advanced about a slush molding powdery material comprising a thermoplastic resin other than vinyl chloride. Use is made of, for example, a thermoplastic polyurethane elastomer having a number-average molecular weight of 20,000 to 50,000 and a glass transition temperature of −35° C. or lower (Patent Document 1).

Use is also made of a granular polyurethane resin composition made mainly of a thermoplastic urethane resin synthesized in a non-aqueous dispersion medium, a polymer of a vinyl monomer, and a thermally crosslinkable monomer (Patent Document 2). Furthermore, use is made of a thermoplastic elastomer composition powder having a particle diameter of 1 to 1000 μm and comprising an acrylic block copolymer and an acrylic polymer having, in a single molecule thereof, reactive functional groups the number of which is 1.1 or more (Patent Document 3).

In a material for slush molding, a colored material is used as a skin material of an automobile interior component in order to cause the component to exhibit high quality feeling. These materials for slush molding, each comprising a thermoplastic resin, are also colored by synthesizing uncolored particles, and then dusting a coloring agent such as an inorganic pigment or an organic pigment onto the surfaces thereof. In this coloring method, however, by shear at the time of stirring and mixing in the step of the coloring or in a step subsequent thereto, particles of the pigment which adhere onto the resin particle surfaces are slipped down from the surfaces, or the pigment particles are aggregated with each other on the particle surfaces. Thus, this method has a problem that the original color of the coloring agent is not expressed, a lump of the pigment is intermingled with the resultant product, or the like.

In order to solve such a problem, suggested is a method in which before a resin is granulated, a liquid prepolymer for the resin is mixed with a coloring agent, and subsequently the mixture is granulated (Patent Document 4).

PRIOR ART DOCUMENTS

Patent Documents

Patent Document 1: JP 11-49948 A
Patent Document 2: JP 2009-91519 A
Patent Document 3: JP 2009-67853 A
Patent Document 4: JP 2005/097901 A1

SUMMARY OF THE INVENTION

Problems to be Solved by the Invention

In the method in which before a resin is granulated, a liquid prepolymer for the resin is mixed with a coloring agent, and subsequently the mixture is granulated, particles of the pigment are incorporated into the resin particles, so that the pigment is not slipped down from the resin particles, and the pigment particles are not aggregated with each other on the particle surfaces; however, when the method is compared with the above-mentioned method of coloring particle surfaces, this method is poorer in productivity since it is unavoidable to wash production facilities carefully whenever the color of products is changed.

An object of the present invention is to provide urethane resin particles for slush molding which make it possible that inconveniences based on the slip-down of a pigment, on the aggregation of particles of the pigment, and on other causes are removed although this coloring is coloring onto the resin particle surfaces, and which are high in productivity.

Means for Solving the Problems

The present inventors have made eager investigations to yield resin particles as described above, so as to find out that fine irregularities are made in surfaces of particles, and a coloring agent is added to the irregular-surface particles, thereby making it possible to fix the pigment particles into depressions in the surfaces, so that the particles can be colored without causing the slip-down of the pigment or the aggregation of the particles thereof. Thus, the present invention has been attained.

Accordingly, the present invention is urethane resin particles (C) for slush mold, which comprise a urethane resin (D) and an additive (N), and which have a shape factor SF1 of 101 to 200, a shape factor SF2 of 120 to 240, and further a central particle diameter of 20 to 500 μm; a process for producing the urethane resin particles (C); a method for coloring the urethane resin particles (C); and a urethane resin molded body obtained by subjecting the urethane resin particles (C) to slush molding.

Effects of the Invention

The use of the urethane resin particles (C) of the present invention for slush molding makes it possible that inconveniences based on the slip-down of a pigment, on the aggregation of particles of the pigment, and on other causes are removed although this coloring is coloring onto the resin particle surfaces.

MODE FOR CARRYING OUT THE INVENTION

The urethane resin particles (C) of the present invention for slush molding have a shape factor SF1 of 101 to 200, and a shape factor SF2 of 120 to 240.

The urethane resin particles (C) have irregular surfaces, so that the SF1 is 101 or more. Particles having a shape factor SF1 of more than 200 have an irregular shape to be deteriorated in powder fluidity.

If particles have a shape factor SF2 of less than 120, even when a coloring agent is added to the particles so that particles of the pigment are fixed onto the surfaces, the pigment particles on the surfaces are slipped down by shear generated when the particles are stirred in a subsequent step; and further the pigment particles are aggregated with each other so that the original color thereof is not developed. When the pigment particle aggregates become large, the aggregates turn into alien substances to deteriorate the quality of the product. On the other hand, particles having a SF2 of more than 240, irregularities in the surfaces are too fine so that the pigment does not easily enter gaps in the irregularities so that the particles are deteriorated in pigment-dispersion stability.

The shape factor SF1 is a factor representing the roundness of the shape of a particle, is a value obtained by projecting a urethane particle onto a two-dimensional plane, dividing the square of the longest diameter of the resultant figure by the area AREA of the figure and then multiplying the resultant value by $100\pi/4$, and is represented by the following expression (1):

$$SF1 = \{(\text{longest diameter})^2/(AREA)\} \times (100\pi/4) \quad (1)$$

When the value of the SF1 is 100, the shape of the urethane particle is a complete sphere. As the SF1 value becomes larger, the particle becomes more irregular in shape.

The shape factor SF2 is a factor representing the proportion of irregularities in the shape of a particle, is a value obtained by projecting a urethane particle onto a two-dimensional plane, dividing the square of the peripheral length PERI of the resultant figure by the area AREA of the figure and then multiplying the resultant value by $100/4\pi$, and is represented by the following expression (2):

$$SF2 = \{(PERI)^2/(AREA)\} \times (100/4\pi) \quad (2)$$

When the value of the SF2 is 100, the surface of the urethane particle has no irregularities. As the SF2 value becomes larger, irregularities in the urethane particle surface become more remarkable.

Examples of the method for measuring the shape factors SF1 and SF2 include a method of taking a photograph of urethane particles by means of a scanning electron microscope (for example, S-800, manufactured by Hitachi Ltd.), a microscope (USB Digital Scale, manufactured by Scalar Corporation), or some other, and introducing this photograph into an image analyzing device (for example, LUSEX 3, manufactured by Nireco Corporation) to make analysis, and a method of using a flow-mode particle image analyzer (for example, FPIA-3000, manufactured by Sysmex Corporation) to make a measurement.

The urethane resin particles (C) have a central particle diameter of 20 to 500 μm, preferably from 30 to 400 μm, more preferably from 50 to 300 μm.

If the particles (C) have a central particle diameter of less than 20 μm, the particles deteriorate in powder fluidity, so that the particles deteriorate in moldability or easily cause the generation of dust when subjected to slush molding. Thus, the operating environment deteriorates. If the particles (C) have a central particle diameter of more than 500 μm, the shape of the powder that has not been leveled remains after the slush molding, or many pinholes are generated in the mold surfaces.

The central particle diameter referred to herein is a volume-average particle diameter, which is the value of the below-sieve 50% particle diameter measured by a laser-light scattering method. An example of an instrument for the measurement is a Microtrac HRA Particle Size Analyzer 9320-X100 (manufactured by Nikkiso Co., Ltd.).

In the urethane resin particles (C) of the present invention, the ratio of the 90% particle diameter to the 10% particle diameter is preferably from 2.0 to 3.0. As used herein, the ratio of the 90% particle diameter of the particles to the 10% particle diameter thereof is a value obtained by dividing the 90% particle diameter by the 10% particle diameter. When this ratio is in this range, the particles are suitable for slush molding, and the number of pinholes is small on the mold surfaces after subjected to slush molding. Moreover, the particles are good in powder fluidity, and the step of classifying the particles becomes unnecessary.

The urethane resin (D), which constitutes the urethane resin particles (C) of the present invention, preferably has a concentration of urea groups of 0.5 to 10% by weight, a total of the concentration of urethane groups and that of the urea groups of 4 to 20% by weight, a melting point of 160 to 260° C. and a glass transition temperature of −65 to 0° C.

Urea groups remarkably improve the urethane resin (D) in strength, solvent resistance, and abrasion resistance; thus, when the urethane resin (D) contains urea groups, the urea groups can largely improve performances of the urethane resin particles (C). The concentration of the urea groups is preferably from 0.5 to 10% by weight, more preferably from 1.0 to 7.0% by weight, and most preferably from 1.5 to 5.0% by weight.

When the concentration of the urea groups is in the range of 0.5 to 10% by weight, remarkable is an effect that the urea groups improve the strength, the solvent resistance and the abrasion resistance. Additionally, when the urethane resin particles (C) are molded and processed, the melting point and the melt viscosity thereof are restrained into low values, so that thermal energy required for the molding can be decreased.

Simultaneously, urethane groups also improve performances of the urethane resin (D), similarly to the urea groups. Thus, the total of the concentration of the urethane groups and that of the urea groups is preferably from 4 to 20% by weight, more preferably from 6 to 15% by weight, and most preferably from 8 to 12% by weight.

In the present invention, the concentration of the urethane groups, and that of the urea groups are the concentration represented by "% by weight" of the urethane groups in the urethane resin (D), and that represented by "% by weight" of the urea groups in the urethane resin (D), respectively.

The urethane resin (D), which constitutes the urethane resin particles (C) of the present invention, preferably has a melting point of 160 to 260° C., more preferably of 210 to 250° C. When the melting point ranges from 160 to 260° C., the particles are excellent in blocking property in an ordinary preserving environment, and further thermal energy at the time of molding can be decreased.

The (D) preferably has a glass transition temperature of −65 to 0° C., and more preferably of −50 to −10° C. When the glass transition temperature ranges from −65 to 0° C., the particles can have impact resistance even at a lower temperature.

Examples of the urethane resin (D) in the present invention include resins yielded by causing an isocyanate group-terminated urethane prepolymer (a) derived from an aliphatic diisocyanate (a1), a monool (a2), a high molecular weight diol (a3) having a number-average molecular weight of 500 to 10,000, and a low molecular weight diol (a4) if necessary to react with an alicyclic diamine and/or an aliphatic diamine (b).

Examples of the aliphatic diisocyanate (a1) constituting the above-described (a) include (i) aliphatic diisocyanates having 2 to 18 carbon atoms (the carbon atoms in the NCO groups are excluded; hereinafter, the same shall apply hereinafter) [such as ethylenediisocyanate, tetramethylenediisocyanate, hexamethylenediisocyanate (HDI), dodecamethylenediisocyanate, 2,2,4-trimethylhexamethylenediisocyanate, lysinediisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate]; (ii) alicyclic diisocyanates having 4 to 15 carbon atoms [such as isophoronediisocyanate (IPDI), dicyclohexylmethane-4,4'-diisocyanate (hydrogenated MDI), cyclohexylenediisocyanate, methylcyclohexylenediisocyanate (hydrogenated TDI), and bis(2-isocyanatoethyl)-4-cyclohexene]; (iii) aromatic aliphatic diisocyanates having 8 to 15 carbon atoms [such as m- and/or p-xylylenediisocyanate(s) (XDI), and $\alpha,\alpha,\alpha',\alpha'$-tetramethylxylylenediisocyanate (TMXDI)]; (iv) modified products of these diisocyanates (modified diisocyanates each having a carbodiimide group, a urethodione group, a urethoimine group, a urea group, or some other group); and mixtures of two or more thereof.

Of these examples, preferred are aliphatic diisocyanates, or alicyclic diisocyanates, and particularly preferred are HDI, IPDI and hydrogenated MDI.

Examples of the above-described monool (a2) include aliphatic monools having 1 to 8 carbon atoms [such as linear monools (such as methanol, ethanol, propanol, butanol, pentanol, hexanol, and octanol), and monools having a branched chain (such as isopropyl alcohol, neopentyl alcohol, 3-methyl-pentanol, and 2-ethylhexanol)]; monools having a cyclic group of 6 to 10 carbon atoms [such as alicyclic group-containing monools (such as cyclohexanol), and aromatic ring-containing monools (such as benzyl alcohol)], and mixtures of two or more thereof.

Of these examples, preferred are aliphatic monools. Examples of the monool that is a high molecular weight monool include polyester monools, polyether monools, polyetherester monools, and mixtures of two or more thereof.

Examples of the high molecular weight diol (a3), which has a number-average molecular weight of 500 to 10,000, include polyester diols, polyether diols, polyetherester diols, and mixtures of two or more thereof.

Examples of the polyester diols include (i) diols each produced by condensation polymerization of a low molecular weight diol, and a dicarboxylic acid or an ester-formable derivative thereof [such as an acid anhydride, a lower alkyl (the number of carbon atoms: 1 to 4) ester, or an acid halide], or a dialkyl carbonate (the number of carbon atoms in each of the alkyl groups: 1 to 4); (ii) diols each produced by ring opening polymerization of a lactone monomer, using a low molecular weight diol as an initiator; (iii) diols each produced by causing a dicarboxylic acid anhydride, and an alkylene oxide to react with each other, using a low molecular weight diol as an initiator; and mixtures of two or more thereof.

Specific examples of the low molecular weight diols in the above-described (i), (ii) and (iii) include aliphatic diols having 2 to 8 carbon atoms [such as linear diols (such as ethylene glycol, diethylene glycol, 1,3-propanediol, 1,4-butanediol, 1,5-pentanediol, and 1,6-hexanediol), and diols having a branched chain (such as propylene glycol, neopentyl glycol, 3-methyl-1,5-pentanediol, 2,2-diethyl-1,3-propanediol, and 1,2-, 1,3- or 2, 3-butanediol)]; diols containing a cyclic group [such as diols having an alicyclic group of 6 to 15 carbon atoms [such as 1,4-bis(hydroxymethyl)cyclohexane, and hydrogenated bisphenol A], diols containing an aromatic ring of 8 to 20 carbon atoms (such as m- or p-xylylene glycols), oxyalkylene ethers of bisphenols (such as bisphenol A, bisphenol S and bisphenol F), oxyalkylene ethers of polynuclear phenols (such as dihydroxynaphthalene), and bis(2-hydroxyethyl)terephthalate]; and alkylene oxide adducts thereof (molecular weight: less than 500), and mixtures of two or more thereof.

Of these examples, preferred are aliphatic diols and alicyclic group-containing diols.

Here, examples of the alkylene oxide include ethylene oxide (EO), propylene oxide (PO), 1,2-, 1,3-, 1,4- or 2,3-butylene oxide, styrene oxide, $\alpha$-olefin oxides having 5 to 10 or more carbon atoms, epichlorohydrin, and (block- or random-added) combinations of two or more thereof.

The specific examples of the dicarboxylic acid or the ester-formable derivative thereof in the above-described (i) include aliphatic dicarboxylic acids having 4 to 15 carbon atoms [such as succinic acid, adipic acid, sebacic acid, glutaric acid, azelaic acid, maleic acid, and fumaric acid], aromatic dicarboxylic acids having 8 to 12 carbon atoms [such as terephthalic acid, and isophthalic acid], ester-formable derivatives thereof [such as acid anhydrides (such as phthalic anhydride, and maleic anhydride), lower alky esters (such as dimethyl esters, and diethyl esters), and acid halides (such as acid chloride)], and mixtures of two or more thereof.

Examples of the lactone monomer in above-described (ii) include lactones having 4 to 12 carbon atoms, for example, γ-butyrolactone, γ-valerolactone, ε-caprolactone, and mixtures of two or more thereof.

Examples of the polyether diols include polyether diols each yielded by subjecting a compound having two hydroxyl groups (for example, the aforementioned low molecular weight diols, and dihydric phenols) to dehydration reaction, and compounds each having a structure in which an alkylene oxide is added to a compound having two hydroxyl groups.

Examples of the dihydric phenols include bisphenols [such as bisphenol A, bisphenol F, and bisphenol S], and monocyclic phenols [such as catechol, and hydroquinone].

Of these examples, preferred are polytetramethylene glycol, and a product obtained by adding an alkylene oxide to dihydric phenol. More preferred is a product obtained by adding EO to dihydric phenol.

Examples of the polyetherester diols include products each yielded by using the above-described polyether diol instead of the low molecular weight diol that is a raw material in the aforementioned polyester diol, for example, products each yielded by condensation polymerization of one or more of the above-described polyether diols, and one or more of the dicarboxylic acids or the ester-formable derivatives thereof exemplified as the raw material of the aforementioned polyester diols.

Of these examples of the high molecular weight diol (a3), preferred are polyester diols, and more preferred are polycondensates each including a low molecular weight diol and a dicarboxylic acid.

As the low molecular weight diol (a4), which is optionally used together with the (a2) and the (a3), the low molecular weight diols exemplified as the starting materials of the aforementioned polyester diols maybe used. Of these examples of the (a4), preferred are aliphatic diols. The use amount of the (a4) is usually 20% or less by weight, and preferably 10% or less by weight based on the weight of the (a3).

The reaction temperature when the isocyanate group-terminated urethane prepolymer (a) is produced may be the same temperature as usually adopted for urethanization. When a solvent is used, the temperature is usually from 20 to 100° C. When no solvent is used, the temperature is usually from 20 to 220° C., and preferably from 80 to 200° C.

In the above-described prepolymerization reaction, a catalyst used ordinarily for polyurethane may be optionally used to promote the reaction. Examples of the catalyst include amine-based catalysts [such as triethylamine, N-ethylmorpholine, and triethylenediamine], and tin-based catalysts [such as trimethyltin laurate, dibutyltin dilaurate, and dibutyltin malate].

When the (a) is produced, the (a1) is used so as to give an excessive mole of isocyanate groups for the total mole number of the terminal hydroxide groups of the (a2), (a3) and (a4), whereby the produced compound can be rendered an isocyanate group-terminated compound.

In the alicyclic diamine and/or aliphatic diamine (b) used for the reaction with the (a), examples of the alicyclic diamine include alicyclic diamines having 6 to 18 carbon atoms [such as 4,4'-diamino-3,3'-dimehyldicyclohexylmethane, 4,4'-diaminodicyclohexylmethane, diaminocyclohexane, and isophoronediamine]; and examples of the aliphatic diamine include aliphatic diamines having 2 to 12 carbon atoms [such as ethylenediamine, propylenediamine, and hexamethylenediamine]; and aromatic aliphatic diamines having 8 to 15 carbon atoms [such as xylylenediamine, and $\alpha,\alpha,\alpha',\alpha'$-tetramethylxylylenediamine]. The above-described compounds may be used alone or in the form of a mixture of two or more thereof. Of these examples, preferred are isophoronediamine, and hexamethylenediamine.

The urethane resin particles (C) of the present invention for slush molding contain, as essential components, the urethane resin (D) and the additive (N). The additive (N) is classified into an additive (N1) to be added before the urethane resin (D) is made into the form of particles, and an additive (N2) to be added after the urethane resin (D) is made into the form of particles to yield urethane resin particles (P). The additive (N) is used as the additive (N1) or the additive (N2).

Examples of the additive (N1) include an inorganic filler, pigment particles (E), a plasticizer, a releasing agent, an organic filler, a stabilizer, and a dispersing agent. Examples of the additive (N2) include a pigment, a plasticizer, a releasing agent, an organic filler, a blocking inhibitor, a stabilizer, and a dispersing agent.

The addition amount (% by weight) of the additive (N) is preferably from 0.01 to 50% by weight, and more preferably from 1 to 30% by weight based on the weight of the (D).

Examples of the inorganic filler include kaolin, talc, silica, titanium oxide, calcium carbonate, bentonite, mica, sericite, glass flake, glass fiber, graphite, magnesium hydroxide, aluminum hydroxide, antimony trioxide, barium sulfate, zinc borate, alumina, magnesia, wollastonite, xonotlite, whisker, and a metal powder.

Of these examples, preferred are kaolin, talc, silica, titanium oxide, and calcium carbonate, and more preferred are kaolin, and talc from the viewpoint of the promotion of the crystallization of the thermoplastic resin.

The volume-average particle diameter ($\mu m$) of the inorganic filler is preferably from 0.1 to 30, more preferably from 1 to 20, and particularly preferably from 5 to 10 from the viewpoint of the dispersibility thereof in the thermoplastic resin.

The pigment particles (E) are not particularly limited, and known organic pigments and/or inorganic pigments maybe used. The particles (E) are incorporated usually in an amount of 10 parts by weight or less, and preferably from 0.01 to 5 parts by weight per 100 parts by weight of the (C).

Examples of the organic pigment include insoluble or soluble azo pigments, copper phthalocyanine-based pigments, and quinacridone-based pigments.

Examples of the inorganic pigments include chromates, ferrocyane compounds, metal oxides (such as titanium oxide, iron oxide, zinc oxide, and aluminum oxide), metal salts [such as sulfates (such as barium sulfate), silicates (such as calcium silicate, and magnesium silicate), carbonates (such as calcium carbonate, and magnesium carbonate), and phosphates (such as calcium phosphate, and magnesium phosphate)], metal powders (such as aluminum powders, iron powders, nickel powders, and copper powders), and carbon black.

The average particle diameter of the pigment particles (E) is not particularly limited, and is usually from 0.05 to 5.0 $\mu m$, and preferably from 0.2 to 1 $\mu m$.

Examples of the plasticizer include phthalic acid esters (such as dibutyl phthalate, dioctyl phthalate, dibutylbenzyl phthalate, and diisodecyl phthalate); aliphatic dibasic acid esters (such as di-2-ethylhexyl adipate, and 2-ethylhexyl sebacate), trimellitic acid esters (such as tri-2-ethylhexyl trimellitate, and trioctyl trimellitate); aliphatic acid esters (such as butyl oleate); benzoic acid esters [such as a dibenzoic acid ester of polyethylene glycol (polymerization degree: 2 to 10), and a dibenzoic acid ester of polypropylene glycol (polymerization degree: 2 to 10)]; aliphatic phosphoric acid esters (such as trimethyl phosphate, triethyl phosphate, tributyl phosphate, tri-2-ethylhexyl phosphate, and tributoxy phosphate); aromatic phosphoric acid esters (such as triphenyl phosphate, tricresyl phosphate, trixylenyl phosphate, cresyldiphenyl phosphate, xylenyldiphenyl phosphate, 2-ethylhexyldiphenyl phosphate, and tris(2,6-dimethylphenyl)phosphate); halogenated aliphatic phosphoric acid esters (such as tris(chloroethyl)phosphate, tris((3-chloropropyl)phosphate, tris(dichloropropyl)phosphate, and tris(tribromoneopentyl) phosphate); and mixtures of two or more thereof.

The releasing agent may be a known releasing agent. Examples thereof include fluorine compound type releasing agents (such as triperfluoroalkyl (the number of carbon atoms: 8 to 20) phosphates, for example, triperfluorooctyl phosphate, and triperfluorododecyl phosphate); silicone compound type releasing agents (such as dimethylpolysiloxane, amino-modified dimethylpolysiloxane, and carboxyl-modified dimethylpolysiloxane); aliphatic acid ester type releasing agents (such as monohydric or polyhydric alcohol esters of aliphatic acid having 10 to 24 carbon atoms, for example, butyl stearate, hardened castor oil, and ethylene glycol monostearate); aliphatic acid amide type releasing agents (such as mono or bisamides of aliphatic acid having 8 to 24 carbon atoms, for example, oleic amide, palmitic amide, stearic amide, and distearic amide of ethylenediamine); metal soaps (such as magnesium stearate, and zinc stearate); natural or synthetic waxes (such as paraffin wax, microcrystalline wax, polyethylene wax, and polypropylene wax); and mixtures of two or more thereof.

The blocking inhibitor is not particularly limited, and may be known inorganic blocking inhibitors, organic blocking inhibitors, and other blocking inhibitors.

Examples of the inorganic blocking inhibitors include silica, talc, titanium oxide, and calcium carbonate.

Examples of the organic blocking inhibitors include thermosetting resins (such as thermosetting polyurethane resins, guanamine-based resins, and epoxy resins) having a particle diameter of 10 $\mu m$ or less, and thermoplastic resins (such as thermoplastic polyurethane urea resins, and poly(meth) acrylic resins) having a particle diameter of 10 $\mu m$ or less.

The stabilizer maybe a compound having, in the molecule thereof, a carbon-carbon double bond (an ethylene bond that may have a substituent) (provided that a double bond in an aromatic ring is excluded), a carbon-carbon triple bond (an acetylene bond that may have a substituent) or other compounds. Examples thereof include esters each including (meth)acrylic acid and a polyhydric alcohol (a polyhydric alcohol of a dihydric to decahydric alcohol; the same shall apply hereinafter) (such as ethylene glycol di(meth)acrylate, trimethylolpropane tri(meth)acrylate, pentaerythritol tetra (meth)acrylate, and dipentaerythritol tri(meth)acrylate); esters each including (meth)allyl alcohol, and a polycarboxylic acid of a divalent to hexavalent carboxylic acid (such as diallyl phthalate, and triallyl trimellitate); poly(meth)allyl ethers of a polyhydric alcohol (such as pentaerythritol(meth) allyl ether); polyvinyl ethers of a polyhydric alcohol (such as ethylene glycol divinyl ether); polypropenyl ethers of a polyhydric alcohol (such as ethylene glycol dipropenyl ether); polyvinylbenzene (such as divinylbenzene); and mixtures of two or more thereof.

Of these examples, preferred are esters each including (meth)acrylic acid and a polyhydric alcohol, and more preferred are trimethylolpropane tri(meth)acrylate, pentaerythritol tetra(meth)acrylate, and dipentaerythritol penta(meth) acrylate from the viewpoint of stability (radical polymerization rate).

A mixing apparatus used when the additive (N2) is added to the urethane resin particles (P) and these components are mixed with each other may be a known powder mixing apparatus. Examples thereof include container-rotating type mixers, fixed-container type mixers, and fluid-moving type mixers. Of these mixing apparatuses, fixed-container type mixers are preferred. More preferred are high-speed flowing type mixers, biaxial paddle type mixers, high-speed shearing mixing apparatuses (such as a Henschel Mixer (registered trademark)), low-speed mixing apparatuses (such as a planetary mixer), and cone-shaped screw mixers (such as a Nauta Mixer (registered trademark)), and even more preferred are biaxial paddle type mixers, low-speed mixing apparatuses (such as a planetary mixer), and cone-shaped screw mixers (such as a Nauta Mixer (registered trademark; this note is omitted hereinafter)). The mixing is preferably attained by dry blending.

The urethane resin particles (C) of the present invention for slush molding are preferably granulated particles. Examples of the process for producing the urethane resin particles (C) include processes described below.

[Process (1) for Producing Urethane Resin Particles (C)]

A mixture (J) of an isocyanate group-terminated urethane prepolymer (a), and a diketimine compound (b1) of an alicyclic diamine and/or an aliphatic diamine (b) is mixed with a mixture (M) of an organic solvent (K) having a dielectric constant of 5 to 25, and an aqueous solution (L) containing water or a surfactant, the solvent (K) being contained in a proportion of 5 to 30% by weight of the solution (L); and then the mixed components are stirred to conduct polymerization reaction to yield urethane resin particles (P).

The process (1) is a production process in which in any step for yielding the particles (P), or after the particles (P) are yielded, an additive (N) is incorporated into the (P), thereby yielding the urethane resin particles (C).

The aqueous solution (L) containing water or a surfactant is preferably an aqueous solution containing a surfactant. The same shall apply to the following production processes (2) to (3).

Specifically, operations for steps (I) to (III) described below are made, thereby yielding the urethane resin particles (C), which have irregular particle surfaces. The particles (C) are characterized in that the particle diameter distribution thereof is sharp.

Step (I): an alicyclic diamine and/or an aliphatic diamine (b) are/is converted to a diketimine compound (b1), and then a mixture (J) of a urethane prepolymer (a) and the diketimine compound (b1) is produced.

Step (II): produced is a mixture (M) of an aqueous solution (L) containing water or a surfactant, and an organic solvent (K) having a dielectric constant of 5 to 25. The (K) is incorporated in a proportion of 5 to 30% by weight of the (L).

Step (III): the mixture (J) and the mixture (M) are mixed with each other, and the mixed components are stirred to conduct polymerization reaction to yield particles (P).

About the step (I):

The diketimine compound (b1) is a reaction compound of the alicyclic diamine and/or aliphatic diamine (b), and a ketone compound. Examples of the ketone compound include aliphatic or alicyclic ketone compounds having 3 to 9 carbon atoms (such as acetone, methyl ethyl ketone, methyl isobutyl ketone, and cyclohexanone). Of these examples, preferred are acetone and methyl ethyl ketone.

The method for synthesizing the diketimine compound (b1) is not particularly limited, and may be a known method. Examples thereof include a method of heating a mixture of the diamine (s) and an excessive amount of the ketone compound, and optionally removing generated water.

The mixture (J) is obtained by mixing, with the above-described urethane prepolymer (a), the diketimine compound (b1) in an amount usually from 0.5 to 1.5 equivalents, and preferably from 0.7 to 1.2 equivalents per equivalent of isocyanate groups of the (a). Outside this range, the urethane resin particles (C) having good mechanical properties are not obtained.

The temperature at the mixing time is preferably from 50 to 80° C., and the period for the stirring is preferably from 30 to 60 seconds.

About the step (II):

Examples of the surfactant used in the aqueous solution (L) containing a surfactant include water-soluble polymers (such as methylcellulose, polyvinyl alcohol, polyethylene glycol, polyacrylic acid salts, polyvinyl pyrrolidone, and Na salts of a copolymer of diisobutylene and maleic acid), inorganic powders (such as a calcium carbonate powder, a calcium phosphate powder, a hydroxyl apatite powder, and a silica powder), and surfactants (such as sodium dodecylbenzenesulfonate, and sodium laurylsulfate).

The use amount of the surfactant is preferably 10% by weight or less, more preferably from 0.001 to 8% by weight, and even more preferably from 0.01 to 5% by weight based on the weight of the (L). When the amount is in the above-described range, no effect is produced onto physical properties of the resin.

The organic solvent (K) is an organic solvent having a dielectric constant of 5 to 25. The dielectric constant is preferably from 6 to 24, and more preferably from 7 to 23. The dielectric constant $\varepsilon$ is represented by the following equation in a case where at the time of filling a sample substance into a space between electrodes of a parallel-plate capacitor having an electric capacity C0 in vacuum, the electric capacity turns to C:

$$\varepsilon = C/C0.$$

When the electric capacity that is measured not in vacuum but in the air is actually used as C0, a difference between the measured capacity and the true C0 can be substantially ignored since the dielectric constant of the air is 1.0006.

The respective dielectric constant values of main solvents are as follows:

Acetone: 21.5; methyl ethyl ketone: 15.5; tetrahydrofuran: 8.2; and methyl acetate: 6.7.

If the organic solvent (K) has a dielectric constant of less than 5, the (K) and the aqueous solution (L) containing a surfactant are not easily mixed with each other. Thus, the particles are not granulated so that particles having irregular surfaces are not obtained. If the constant is more than 25, the dielectric constant of the mixture (M) turns high. Thus, the particles are not granulated so that particles having irregular surfaces are not obtained.

Examples of the organic solvent (K) include ketones, alcohols, ethers, and esters, and a combination of two or more thereof. The (K) is preferably at least one selected from the group consisting of ketones having 3 to 9 carbon atoms, ethers having 4 to 8 carbon atoms, and esters having 3 to 6 carbon atoms; or a combination of two or more selected therefrom.

Examples of the ketones having 3 to 9 carbon atoms include acetone, methyl ethyl ketone (hereinafter MEK), methyl isobutyl ketone (hereinafter MIBK), and diethyl ketone.

Examples of the ethers having 4 to 8 carbon atoms include tetrahydrofuran (hereinafter THF). Examples of the esters having 3 to 6 carbon atoms include methyl acetate, and ethyl acetate.

Of these examples, preferred are acetone, methyl ethyl ketone, tetrahydrofuran, and methyl acetate.

The content of the (K) in the solution (L) is from 5 to 30% by weight, preferably from 7 to 28% by weight, and even more preferably from 10 to 25% by weight. If the content of the (K) is less than 5% by weight, the particles are not granulated so that particles having irregular surfaces are not obtained. If content of the (K) is more than 30% by weight, the granulation of the particles cannot be controlled so that particles having a target volume-average particle diameter are not obtained.

The temperature when the (K) and the (L) are mixed with each other is preferably from 10 to 40° C. It is preferred that the peripheral speed is from 0.05 to 5.0 m/s, and the mixing period is from 1 to 5 minutes. The mixing is performed preferably just before the step (III).

About the step (III):

When the mixture (J) and the mixture (M) are mixed with each other and the mixed components are stirred to conduct polymerization reaction, the stirring is performed under a condition that the peripheral speed is from 10 to 40 m/s, and preferably from 15 to 25 m/s. The mixing period is preferably from 30 seconds to 5 minutes. The temperature of the mixture (J) is preferably from 50 to 80° C., and that of the mixture (M) is preferably from 10 to 40° C. When the mixing conditions are in the above-described ranges, the shear and aggregation of the particles are repeated in the polymerization reaction to make it possible to yield particles having irregular surfaces and having a sharp particle diameter distribution.

The apparatus for the granulation is not particularly limited as far as the apparatus is an apparatus commercially available as an emulsifying machine or a dispersing machine. Examples thereof include batch type emulsifying machines such as a homogenizer (manufactured by IKA), a Polytron (manufactured by Kinematica, Inc.), and a T K Auto Homomixer (manufactured by PRIMIX Corporation), continuous type emulsifying machines such as an Ebara Milder (manufactured by Ebara Corporation), a T K Filmix, and a T K Pipe Line Homomixer (manufactured by PRIMIX Corporation), a colloidal mill (manufactured by Shinko Pantec Co., Ltd.), a slusher, a trigonal wet pulverizer (manufactured by Mitsui Miike Chemical Engineering Machinery, Co., Ltd.), a Capitron (manufactured by Eurotec Ltd.), and a fine flow mill (manufactured by Pacific Machinery & Engineering Co., Ltd.), high-pressure emulsifying machines such as a Micro Fluidizer (manufactured by MIZUHO Industrial Co., Ltd.), a Nanomizer, (manufactured by Nanomizer Inc.), and an APV Gaulin (manufactured by Gaulin), membrane emulsifying machines such as a membrane emulsifying machine (manufactured by REICA Co., Ltd.), vibrating emulsifying machines such as a Vibro Mixer (manufactured by REICA Co., Ltd.), and ultrasonic emulsifying machines such as an ultrasonic homogenizer (manufactured by Branson). Of these examples, preferred are an APV Gaulin, a homogenizer, a T K Auto Homomixer, an Ebara Milder, a T K Filmix, and a T K Pipe Line Homomixer.

The method for the solid-liquid separation may be known centrifugal separation, belt press, filter press or some other method. When the resultant solid is further dried by a known method, the urethane resin particles (P) can be yielded which have surfaces having irregularities.

In any step for yielding the particles (P), or after the particles (P) are yielded, an additive (N) is incorporated into the (P), thereby making it possible to yield the urethane resin particles (C).

The method for adding the additive (N) to the urethane resin particles (P), and mixing these substances is the same as described above.

[Process (2) for Producing Urethane Resin Particles (C)]

Through a step 1 and a step 2-1 or 2-2 that are described below, urethane resin particles (P) are yielded which have surfaces having irregularities. The process (2) is a production process in which in any step for yielding the particles (P), or after the particles (P) are yielded, an additive (N) is incorporated into the (P), thereby yielding the urethane resin particles (C). The particles (C) are characterized in that the particle diameter distribution thereof is sharp.

Step 1:

A step of producing urethane resin fine particles (G) containing a urethane resin (D), and having a central particle diameter of 1 to 100 μm.

Step 2-1:

A step of heating the urethane resin fine particles (G) to a temperature of [the thermally softening temperature of the (D) −10] to [the thermally softening temperature of the (D) +10]° C. while the particles are stirred at a peripheral speed of 0.5 to 50 m/s, whereby the particles are granulated; and then cooling the particles after it is verified that the central particle diameter of the resultant particles reaches a predetermined particle diameter, whereby the resultant particles are granulated into the urethane resin particles (P).

Step 2-2:

A step of heating the (G) to a temperature of 70 to [the thermally softening temperature of the (D) +10]° C. in the presence of an organic solvent (T), the difference between the solubility parameter (SP value) of the (T) and that of the urethane resin (D) being 3 or less, and the amount of the (T) being from 5 to 30% by weight based on the weight of the (G), while the particles (G) are stirred at a peripheral speed of 0.5 to 50 m/s, whereby the particles (G) are granulated; and then cooling the resultant particles after it is verified that the central particle diameter of the resultant particles reaches a predetermined particle diameter, whereby the resultant particles are granulated into the urethane resin particles (P).

About the step 1:

The urethane resin fine particles (G) have a central particle diameter of 1 to 100 μm, preferably 5 to 70 μm, and even more preferably 10 to 50 μm.

If a raw material fine powder having a central particle diameter more than 100 μm is used, the particle diameter distribution of the produced thermoplastic polyurethane resin powder becomes wide so that the powder is poor in powder fluidity. The use of a raw material having a central particle diameter less than 1 μm is unsuitable from the viewpoints of the powder fluidity and the scattering of the powder in the production, and other viewpoints.

The urethane resin fine particles (G) are yielded, for example, by causing an isocyanate group-terminated urethane prepolymer (a) to react with a diketimine compound (b1) of an alicyclic diamine and/or an aliphatic diamine (b) in an aqueous solution (L) containing water or a surfactant. Specifically, those described in, for examples JP-A-H8-120041 and others, may be used.

The central particle diameter of the (G) can be controlled into a size of 1 to 100 μm in accordance with the amount of the dispersing agent, the rotation number of the dispersing machine, or some other factor.

The thermally softening temperature of the urethane resin (D) is not particularly limited, and is preferably from 100 to 200° C., and more preferably from 120 to 180° C. When the thermally softening temperature is set into the above-described range, a thermoplastic polyurethane resin powder can be yielded which is excellent in heat resistance, and thermal meltability.

About the step 2-1:

In the granulating temperature, the particles are heated preferably to a temperature of [the thermally softening temperature of the (D) −10] to [the thermally softening temperature of the (D) +10]° C., and more preferably a temperature of [the thermally softening temperature of the (D) −5] to [the thermally softening temperature of the (D) +5]° C.

At the time of the granulation, the stirring is performed such that the peripheral speed is from 0.5 to 50 m/s, and preferably from 8 to 40 m/s. If the peripheral speed is less than 0.5 m/s, the cohesive force between the particles is far larger than the shearing force so that the particles become coarse. If the peripheral speed is more than 50 m/s, the shearing force is very strong so that at the granulation time the particle diameter cannot be controlled. The peripheral speed is preferably from 8 to 40 m/s since heat can be evenly given to the powder.

When the peripheral speed is 8 m/s or more, the particles generate heat resulting from frictional heat based on the shearing. When this heat is used to heat the powder to be granulated, deposits on the jacket can be made extremely lower in quantity than when the particles are granulated only by heating the jacket.

The granulating machine is not particularly limited, and preferably an apparatus good in stirring efficiency. Examples thereof include high-speed shearing mixing apparatuses [such as a "Henschel Mixer" manufactured by Nippon Coke & Engineering Co., Ltd., and a "High Speed Mixer" manufactured by Fukae Industries Co., Ltd.], and low-speed mixing apparatuses [such as a planetary mixer manufactured by Asada Iron Works Co., Ltd., and a Nauta Mixer manufactured by Hosokawa Micron Group].

The end point of the granulation is decided to a point where the central particle diameter of the urethane resin particles (P) that is obtained while the central particle diameter is measured becomes a predetermined desired particle diameter.

The predetermined desired particle diameter may be preferably selected from the range of 10 to 500 μm. When the granulation has reached the end point, the urethane resin particles (P) are immediately cooled to 50° C. or lower so as not to advance further granulation. The central particle diameter is measured through a laser diffraction type particle diameter distribution measuring apparatus.

About the step 2-2:

The method for adding the organic solvent (T) is not particularly limited. Thus, the total volume of the (T) may be charged at a time into the urethane resin fine particles (G) before the particles (G) are granulated, or the (T) may be intermittently charged thereinto.

The method for the charging is preferably the dropping or spraying of the solvent while the particles are stirred. The spraying is preferred from the viewpoint of evenness.

In the organic solvent (T), the difference between the solubility parameter (SP value) thereof and that of the urethane resin (D) is 3 or less, and preferably 1 or less. If the difference between the SP value of the (D) and that of the (T) is more than 3, the granulation is not attained.

The SP value is calculated by the Fedors method.

The SP value is represented by the following equation:

$$\text{SP value}(\delta) = (\Delta H/V)^{1/2}$$

wherein $\Delta H$ represents the molar evaporation heat (cal/mol), and V represents the molar volume (cm$^3$/mol).

For $\Delta H$, and V, the following may be used: the total ($\Delta H$) of the respective molar evaporation heats of atomic groups, and the total (V) of the respective molar volumes thereof described in "POLYMER ENGINEERING AND SCIENCE FEBRUARY, 1974, Vol. 14, No. 2, ROBERT F. FEDORS (pp. 151-153)", and "POLYMER ENGINEERING AND SCIENCE JUNE, 1974, Vol. 14, No. 6, ROBERT F. FEDORS (p. 472)".

The SP value is an index for representing the following: substances near to each other in this value are easily mixed with each other (high compatibility) ; and substances apart from each other in this value are not easily mixed with each other.

The solubility parameter of the urethane resin (D) is preferably from 8 to 12.

Examples of the organic solvent (T) having a difference of 3 or less between the SP value of the solvent and that of the (D) include ketones, alcohols, ethers, and a combination of two or more thereof. Preferred are at least one selected from the group consisting of ketones having 3 to 9 carbon atoms, and ethers having 4 to 8 carbon atoms; and a combination of two or more selected therefrom.

Examples of the ketones having 3 to 9 carbon atoms include acetone, methyl ethyl ketone (hereinafter MEK), methyl isobutyl ketone (hereinafter MIBK), and diethyl ketone. Examples of the ethers having 4 to 8 carbon atoms include tetrahydrofuran (hereinafter THF). Preferred are acetone, methyl ethyl ketone, methyl isobutyl ketone, and tetrahydrofuran.

The addition amount of the organic solvent (T) is from 5 to 30% by weight, and preferably from 10 to 25% by weight of the urethane resin fine particles (G). If the addition amount is less than 5% by weight, the bonding strength between the particles is weak so that the granulation is not attained. If the addition amount is more than 30% by weight, the particles turn into a pasty form. Thus at the time of the granulation, coarse particles are generated so that the particle diameter distribution becomes wide.

When the organic solvent (T) is sprayed, the granulation can be attained at a lower temperature as compared with when the (T) is not sprayed. The particles are heated such that the granulation temperature is preferably a temperature of 70 to [the thermally softening temperature of the (D) +10]° C., and more preferably a temperature of 80 to [the thermally softening temperature of the (D) +5]° C.

The stirring at the granulation time is performed at a peripheral speed of 0.5 to 50 m/s, and preferably 5 to 40 m/s. If the peripheral speed is less than 0.5 m/s, the cohesive force between the particles is far larger than the shearing force so that the particles become coarse. If the peripheral speed is more than 50 m/s, the shearing force is very strong so that at the granulation time the particle diameter cannot be controlled.

The granulating machine is the same as used in the step 2-1.

The end point of the granulation may be performed in the same way as in the step 2-1.

The method for removing the remaining portion of the organic solvent (T) after the granulation maybe a known method (such as de-solvation).

The removing method is, for example, a method of heating the system while the inside thereof is stirred under reduced pressure or normal pressure, thereby removing the solvent. However, if the system is heated to a temperature of 70° C. or higher, the resultant is further granulated. Thus, it is essential that the heating temperature is 70° C. or lower.

The urethane resin particles (P) yielded in this process are characterized in that the particles (P) have a particle diameter distribution Cv of 20 to 55 (the ratio of the 90% particle diameter to the 10% particle diameter is from 2.0 to 3.0), and the particle diameter distribution is sharp in a wide particle diameter range.

The central particle diameter d of the (P) is preferably from 20 to 500 μm since the particle diameter distribution Cv is easily controlled.

The central particle diameter d, and the particle diameter distribution Cv referred to herein maybe measured by means of a laser diffraction type particle diameter distribution measuring apparatus, or some other apparatus. In a relative cumulative particle diameter distribution curve obtained in this manner, d corresponds to the particle diameter d50 obtained when the cumulative quantity is 50%, and Cv is defined as represented by the following equation, using the standard deviation SD and d50:

$$Cv = SD/d50$$

In any step for yielding the particles (P), or after the particles (P) are yielded, an additive (N) is incorporated into the (P), thereby yielding the urethane resin particles (C).

The method for adding the additive (N) to the urethane resin particles (P), and mixing these substances is the same as described above.

[Process (3) for Producing Urethane Resin Particles (C)]

Through steps 3 and 4 described below, urethane resin particles (P) are yielded which have surfaces having irregularities. The process (3) is a production process in which in any step for yielding the particles (P), or after the particles (P) are yielded, an additive (N) is incorporated into the (P), thereby yielding the urethane resin particles (C). The particles (C) are characterized in that the particle diameter distribution thereof is sharp.

Step 3:

A step of producing urethane resin fine particles (G) containing urethane resin (D), and having a central particle diameter of 1 to 100 μm; and subsequently producing a slurry (R) which contains the (G) and an aqueous solution (L) containing water or a surfactant.

Step 4:

A step of adding, to the slurry (R), an organic solvent (T), the difference between the solubility parameter (SP value) of the (T) and that of the urethane resin (D) being 3 or less; and then stirring the resultant mixture at a temperature of 10 to [the boiling point of the organic solvent (T)]° C. and a peripheral speed of 0.1 to 10 m/s, whereby the urethane resin fine particles (G) are granulated into the urethane resin particles (P).

About the step (3):

The production of the urethane resin fine particles (G) is the same as in the aforementioned production process (2).

The urethane resin fine particles (G) are dispersed in the aqueous solution (L) containing water or a surfactant to prepare a slurry. The aqueous solution (L) containing water or a surfactant is the same as in the aforementioned production process (1).

The urethane resin fine particles (G) are added to the (L) preferably in a proportion of 15 to 50% by weight, and more preferably 20 to 40% by weight. When the proportion is in the above-described range, the frequency of collision between the particles is high so that the particles can be mixed with each other evenly. Thus, a target particle diameter can be obtained.

The method for preparing the slurry is preferably a method of charging the urethane resin fine particles (G) into the (L) without causing the (G) to aggregate with each other.

The temperature for preparing the slurry is preferably from 5 to 40° C. The mixture is stirred preferably under a condition that the peripheral speed is from 0.1 to 10 m/s.

About the step (4):

After the above-mentioned step for preparing the slurry, an organic solvent (T) is added to the slurry (R). In the organic solvent (T), the difference between the solubility parameter (SP value) thereof and that of the urethane resin (D) is 3 or less, preferably 1 or less. If the difference between the SP value of the (D) and that of the (T) is more than 3, the granulation is not attained.

The organic solvent (T) is the same as in the aforementioned production process (2).

The addition amount of the organic solvent (T) to the above-described slurry (R) is preferably from 2 to 50% by weight, and more preferably from 5 to 30% by weight. When the amount is from 2 to 50% by weight, the bonding strength between the particles is strong and further the particle diameter distribution is also narrow.

The method for adding the organic solvent (T) is not particularly limited, and the (T) maybe charged into the slurry (R) at a time or intermittently. In the middle of the granulation, the solvent may be dropwise added thereto.

When the organic solvent (T) is added to the slurry (R) and the mixture is stirred, the urethane resin fine particles (G) can be granulated into the urethane resin particles (P).

At the granulation, the mixture is stirred at a peripheral speed of 0.1 to 10 m/s, and preferably 0.5 to 5 m/s. If the peripheral speed is less than 0.1 m/s, the cohesive force between the particles is far larger than the shearing force so that the particles become coarse. If the peripheral speed is more than 10 m/s, the shearing force is very strong so that the particles do not aggregate with each other. Thus, the granulation cannot be attained.

The stirring blades are not particularly limited, and are preferably blades good in stirring efficiency. Examples thereof include paddle blades, ribbon blades, spiral blades, and anchor-shaped blades.

The granulation temperature is from 10 to [the boiling point of the organic solvent (T)]° C., and preferably from 50 to [the boiling point of the organic solvent (T) −10]° C.

If the granulation temperature is lower than 10° C., the particles are not combined with each other so that the granulation cannot be attained. If the temperature is higher than the boiling temperature of the organic solvent (T), the organic solvent (T) vaporizes so that a target particle size and a target particle size distribution cannot be obtained.

The end point of the granulation is decided to a point where the central particle diameter of the urethane resin particles (P) that is obtained while the particle diameter is measured reaches a desired particle diameter in the range of 20 to 500 μm.

The method for the solid-liquid separation, and the method for the drying are the same as in the process (1) for producing the urethane resin particles (C).

The urethane resin particles (P) yielded through this process are characterized in that the particles (P) have a central particle diameter of 20 to 500 μm, and a particle diameter distribution Cv of 20 to 55 (the ratio of the 90% particle diameter to the 10% particle diameter is from 2.0 to 3.0), and the particle diameter distribution is sharp in a wide particle diameter range.

The present production process does not make it possible to produce urethane resin particles (P) having a particle diameter distribution Cv of less than 20. If the Cv is over 55, generated are fine particles having sizes of several micrometers and coarse particles having sizes of several hundreds of micrometers. It is therefore necessary to classify the particles.

In any step for yielding the particles (P), or after the particles (P) are yielded, an additive (N) is incorporated into the (P), thereby making it possible to yield the urethane resin particles (C).

The method for adding the additive (N) to the urethane resin particles (P), and mixing these substances is the same as described above.

[Method for Coloring Urethane Resin Particles (C)]

The urethane resin particles (C) can furthest produce advantageous effects thereof when the additive (N) contains at least pigment particles (E) so that the particles (C) are colored.

In other words, for the urethane resin particles (C) comprising the urethane resin particles (P) and the pigment particles (E), the particles (P) are mixed with and the (E), thereby making it possible to yield the urethane resin particles (C) for slush molding in which the particles (E) adhere to the surfaces of the particles (P).

In the urethane resin particles (C), almost all of the mixed particles (E) adhere onto the surfaces of the particles (P), in particular, depressions therein so that aggregations of the pigment particles are hardly generated. Thus, the particles (C) are characterized in that a particle (F) is contained in a number of one or less per one hundred of the urethane resin particles (P), the particle (F) being a particle that has a particle diameter of 20 to 140 μm and is an aggregate of the pigment particles (E).

For the urethane resin particles (C) of the present invention, it is desired that the particle (F) is contained in a number of one or less per one hundred of the urethane resin particles (P), the particle (F) being a particle that has a particle diameter of 20 to 140 μm and is an aggregate of the pigment particles (E).

Examples of the particle (F) include not only particles produced by the aforementioned pigment particles (E) slipped down from the surfaces of the urethane resin particles (C) and then aggregated with each other, but also particles that are the pigment particles (E) which have already aggregated before mixed with the urethane resin particles (P), that is, at the time when the pigment particles (E) are in the form of a coloring agent paste, a pigment powder or some other. When the particle (F) is contained in a number of one or less per one hundred of the urethane resin particles (P), the color of the pigment is well developed. Thus, the use amount of the pigment is favorably sufficient to be small for making vivid the developed color of the urethane resin particles (C), or the color of a body obtained by melt-molding the particles (C).

When the additive (N) is pigment-dispersed resin particles (SE) in which the pigment particles (E) are dispersed in a resin (S), for the urethane resin particles (C) comprising the urethane resin particles (P) and the pigment-dispersed resin particles (SE), the particles (P) are mixed with the (SE), thereby making it possible to yield the urethane resin particles (C) for slush molding in which the particles (SE) adhere onto the surfaces of the particles (P).

By adding, to such particles having irregular surfaces, pigment-dispersed resin particles in which a pigment is dispersed in a resin in a high concentration, the resin particles where the dispersion state is kept can be fixed into depressions in the surfaces. Thus, the particles can be colored without causing the pigment to slip down or aggregate.

Examples of the resin (S) include a vinyl resin, an epoxy resin, a polyester resin, a polyamide resin, a polyurethane resin, a polyimide resin, a silicon-based resin, a phenolic resin, a melamine resin, a urea resin, an aniline resin, an ionomer resin, and a polycarbonate resin; and alloys, blend resins, block copolymers, or graft polymers each obtained by mixing two or more of these resins with each other. Of these examples, preferred are a urethane resin and alloys or blend resins each including a urethane resin and some other resin from the viewpoint of compatibility.

Examples of the method for dispersing the pigment (E) into the resin (S) include, but are not particularly limited to, methods of mixing and dispersing of the pigment (E) by use of a three-roll mill, a Banbury mixer, a biaxial extruder, a kneader or some other. The temperature at the time of the dispersing is usually from 100 to 180° C., and the dispersing period is usually from 1 minute to 1 hour. Alternatively, there is a method of dispersing the pigment (E) into a monomer for the resin, which is at a stage before polymerization, and then polymerizing the monomer into a high molecular weight, thereby yielding a pigment-dispersed resin in which the pigment particles (E) are dispersed in the resin (S). There is a method of using a jet mill pulverizer or some other to pulverize the pigment-dispersed resin in which the particles (E) have been dispersed by these methods, thereby yielding the pigment-dispersed resin particles (SE).

Further, there is exemplified a method of dispersing a pigment into a monomer for the resin, which is at a stage before polymerization, emulsifying or dispersing this dispersion system into water, or an organic solvent in which the monomer is insoluble, and subsequently polymerizing this monomer, thereby yielding the pigment-dispersed resin particles (SE).

The concentration of the (E) in the (SE) is preferably from 20 to 90% by weight, more preferably from 30 to 80% by weight, and most preferably from 40 to 60% by weight. The ratio of the particle diameter of the resin particles (P) to that of the pigment-dispersed resin particles (SE) is preferably from 100:0.5 to 100:50, more preferably from 100:1 to 100:10, and most preferably from 100:1.5 to 100:5.

When the additive (N) is a pigment-dispersed liquid (HE) in which the pigment particles (E) are dispersed in an organic compound (H) having a melting point of 0° C. or lower and a boiling point of 170° C. or higher, and containing in the molecule thereof at least one ester group, for the urethane resin particles (C) comprising the urethane resin particles (P) and the pigment-dispersed liquid (HE), the particles (P) are mixed with the (HE), thereby making it possible to yield the urethane resin particles (C) for slush molding in which the (HE) adheres onto the surfaces of the particles (P).

When this method is performed, the urethane resin particles (C) can be efficiently colored with good reproducibility of the color.

The organic compound (H) is good in property of dispersing the pigment particles (E); thus, the pigment-dispersed liquid (HE) can be stored over a long term without generating the aggregation of the pigment. Moreover, the pigment-dispersed liquid (HE) comprising the organic compound (H) and the pigment particles (E) is high in affinity with the urethane resin particles (P); thus, the surfaces of the particles can be colored evenly in a shorter period in this case than in a case where the urethane resin particles (P) are colored with only the pigment particles (E).

Examples of the organic compound (H) include the same as given as the examples of the aforementioned plasticizer.

Of these examples, preferred are benzoic acid esters, and particularly preferred are dibenzoic acid esters of polyethylene glycol.

The urethane resin particles (C) of the present invention for slush molding may be subjected to slush molding, thereby yielding a resin molded body. For the slush molding, use may be made of a method of vibrating/rotating a box in which the urethane resin particles (C) of the present invention are put, and a heated mold together, to melt and fluidize the urethane resin particles (C) inside the mold, and then cooling/solidifying the fluidized particles to produce a molded body (such as a skin body).

The temperature (° C.) of the mold is preferably from 200 to 280° C.

The resin molded body, which is yielded by the slush molding of the urethane resin particles (C) of the present invention, is suitable for interior materials (such as an instrument panel, and a door trim) of an automobile.

For example, the resin molded body (skin body) molded from the urethane resin particles (C) of the present invention preferably has a thickness of 0.3 to 1.2 mm. The molded body (skin body) can be rendered a resin molded product by setting the body to a foaming mold to bring the front surface of the body into contact with the mold, and then causing a urethane foam to flow thereinto, thereby forming a foamed layer having a thickness of 5 to 15 mm onto the rear surface.

In the case of smooth surfaces, which have no irregularities, a particle (F), which is an aggregate of the pigment particles (E), is remarkably generated. However, the urethane resin particles (C) of the present invention have irregular particle surfaces; thus, it does not occur that the pigment particles adhering onto the resin particle surfaces are slipped down from the surfaces or the pigment particles are aggregated with each other on the particle surfaces by shear generated at the stirring and mixing time in the coloring step, or a step subsequent thereto. As a result, the urethane resin particles (C) are good in color-developability. Furthermore, there are not caused a problem that the particles (F), which are aggregates of the pigment, are intermingled with the final product, or other problems.

Moreover, when the process of the present invention is compared with a process in which a pigment is mixed with a liquid raw material of particles, which is at a stage before the raw material is made into the particles, the present invention does not require any step of washing facilities for the production carefully whenever the product color is changed. Thus, the present invention can make an improvement in production performance.

EXAMPLES

Hereinafter, the present invention will be more specifically described by way of examples. However, the present invention is not limited thereto. In the following description, "part(s)" and "%" represent "part(s) by weight" and "% by weight", respectively.

Production Example 1

Production of Prepolymer Solution (U-1):

Into a reaction vessel equipped with a thermostat, a stirrer and a nitrogen-blowing tube were charged polybutylene adipate (575 parts) having a number-average molecular weight (hereinafter described as Mn) of 1000, polyhexamethylene isophthalate (383 parts) having an Mn of 900, 1-octanol (16.8 parts), and kaolin (18.6 parts) having a volume-average particle diameter of 9.2 μm, and then the inside of the vessel was purged with nitrogen. Thereafter, while stirred, the mixture was heated to 110° C. to be melted. The mixture was then cooled to 60° C. Subsequently, thereinto was charged hexamethylene diisocyanate (242 parts), and then the reactive components were caused to react at 85° C. for 6 hours. Next, the mixture was cooled to 60° C., and then thereto were added tetrahydrofuran (217 parts), a stabilizer (2.5 parts) [Irganox 1010, manufactured by Ciba Specialty Chemicals Ltd.], and an ultraviolet absorber (1.91 parts) [Tinuvin 571, manufactured by Ciba Specialty Chemicals Ltd.]. The components were mixed with each other evenly to yield a prepolymer solution. In the resultant prepolymer solution (U-1), the NCO content was 2.2%.

Production Example 2

Production of Prepolymer (U-2):

Into a reaction vessel equipped with a thermostat, a stirrer and a nitrogen-blowing tube were charged polybutylene adipate (1214 parts) having an Mn of 1000, polyethylene phthalate having an Mn of 900 (ratio by weight of terephthalic acid to isophthalic acid=50/50) (304 parts), 1-octanol (27.6 parts), and kaolin (18.6 parts) having a volume-average particle diameter of 9.2 μm, and then the inside of the vessel was purged with nitrogen. Thereafter, while stirred, the mixture was heated to 110° C. to be melted. The mixture was then cooled to 60° C. Subsequently, thereinto was charged hexamethylene diisocyanate (313.2 parts), and then the reactive components were caused to react at 85° C. for 6 hours. Next, the system was cooled to 60° C., and then thereto were added tetrahydrofuran (425 parts), a stabilizer (2.7 parts) [Irganox 1010], and an ultraviolet absorber (1.91 parts) [Tinuvin 571, manufactured by Ciba Specialty Chemicals Ltd.]. The components were mixed with each other evenly to yield a prepolymer solution. In the resultant prepolymer solution (U-2), the NCO content was 1.6%.

Production Example 3

Production of Prepolymer (U-3):

A prepolymer (U-3) was yielded in the same way as in Production Example 2 except that use was made of polyethylene terephthalate having an Mn of 2500 (ratio by weight of terephthalic acid to isophthalic acid=50/50) instead of the polyethylene phthalate (terephthalic acid to isophthalic acid=50/50)having an Mn of 900. In the resultant prepolymer solution (U-3), the NCO content was 0.8%.

Production Example 4

Production of MEK Ketimine Compound of Diamine:

While hexamethylenediamine and an excessive amount of MEK (methyl ethyl ketone; molar quantity: 4 times the molar quantity of the diamine) were refluxed at 80° C. for 24 hours, water generated therefrom was removed to the outside of the system. Thereafter, an unreacted portion of MEK was removed under reduced pressure to yield an MEK ketimine compound.

Production Example 5

Production of Dispersion Medium (Y-1):
Into 980 parts of water was dissolved 20 parts of a dispersing agent containing a Na salt of a copolymer including diisobutylene and maleic acid [Sanspearl PS-8, manufactured by Sanyo Chemical Industries, Ltd.] as a dispersing agent, and then the temperature of the solution was adjusted to 25° C. to yield a dispersion medium (Y-1).

Production Example 6

Production of Pigment-Dispersed Resin Particles (SE-1):
Into a reaction vessel equipped with a thermostat, a stirrer and a nitrogen-blowing tube were charged 300 parts of a bisphenol A-EO (2 moles) adduct, 440 parts of a bisphenol A-PO (2 moles) adduct, 270 parts of terephthalic acid, and 2 parts of potassium titanyl oxalate as a condensation catalyst. The reactive components were caused to react with each other at 230° C. in the flow of nitrogen for 10 hours while water generated therefrom was distilled off. Next, the reactive components were caused to react with each other under a reduced pressure of 5 to 20 mmHg. At a time when the acid value turned to 2 or less, the system was cooled to 180° C. Thereto was added 45 parts of trimellitate anhydride to cause the reactive components to react with each other for 2 hours under normal pressure in a closed environment. Thereafter, the reaction product was taken out. In this way, a polyester resin was yielded. Three rolls having a heating temperature of 130° C. were used to mix 100 parts of this polyester resin with 70 parts of carbon black, MA-100 [manufactured by Mitsubishi Chemical Corporation]. The mixture was cooled to room temperature, and then pulverized by means of a jet mill pulverizer to yield pigment-dispersed resin particles (SE-1) (content of the pigment particles: 41% by weight), which were a 400-mesh(sieve opening size: 38 μm)-passed product. The (SE-1) had a central particle diameter of 17 μm.

Example 1

Production of Urethane Resin Particles (P-1):
Into a reaction vessel were charged the prepolymer solution (U-1) (100 parts) and the MEK ketimine compound (5.6 parts), and these components were mixed with each other. Thereto were added 340 parts of an aqueous solution in which a dispersing agent (Sanspearl PS-8 (1.3 parts) manufactured by Sanyo Chemical Industries, Ltd.), and tetrahydrofuran (dielectric constant: 8.2) (68 parts) were dissolved (content of the organic solvent in the aqueous solution: 20% by weight). An ultra disperser manufactured by Yamato Scientific Co., Ltd. was then used to mix these components at a rotation number of 9000 rpm (peripheral speed: 15 m/s) for 1 minute. This mixture was shifted to a reaction vessel equipped with a thermostat, a stirrer and a nitrogen-blowing tube. The inside of the vessel was purged with nitrogen, and then the reactive components therein were caused to react with each other at 50° C. for 10 hours while the mixture was stirred. After the end of the reaction, the resultant was separated by filtration, and then dried to produce urethane resin particles (P-1). The (P-1) had an Mn of 25,000, and a central particle diameter of 151 μm.

Into a Henschel Mixer were charged 100 parts of the resultant (P-1) and a pigment-dispersed liquid (HE-1) (2.7 parts) as a coloring agent in which 1.0 part of carbon black was dispersed in 1.0 part of an organic compound (H-1) which was a dibenzoic acid ester (Sansoft EB300, manufactured by Sanyo Chemical Industries, Ltd., melting point: 0° C. or lower; boiling point: 300° C. or higher) of polyethylene glycol (polymerization degree: 2 to 10). The mixture was stirred at a rotation speed of 700 minutes$^{-1}$ for 1 minute. Next, the mixture was shifted to a Nauta Mixer having a volume of 100 L, and thereto were charged dipentaerythritol pentaacrylate (4.0 parts), an ultraviolet stabilizer (0.3 parts) [Tinuvin 765, manufactured by Ciba Specialty Chemicals Ltd.] to immerse the mixture in this liquid at 70° C. for 4 hours. After the 4-hour immersion, thereinto were charged two kinds of internally-additive releasing agents {a dimethylpolysiloxane (0.06 parts) [KL45-10000, manufactured by Nippon Unicar Co., Ltd.], and a carboxyl-modified silicone (0.05 parts) [X-22-3710, manufactured by Shin-Etsu Chemical Co., Ltd.]}, and then these components were mixed with each other for 1 hour. Thereafter, the mixture was cooled to room temperature. Finally, thereto was charged a blocking inhibitor [Ganz Pearl PM-0305, manufactured by Ganz Chemical Co., Ltd.] (0.5 parts), and the components were mixed with each other. The mixture was passed through a sieve having a mesh of 48. From the resultant, particles passed through a sieve having a mesh of 200 were removed to yield urethane resin particles (C-1) for slush molding.

Example 2

Production of Urethane Resin Particles (C-2):
Urethane resin particles (P-2) were produced in the same way as in Example 1 except that instead of the tetrahydrofuran, 15 parts of sodium chloride was added to the aqueous solution. The (P-2) had an Mn of 25,000, and a central particle diameter of 180 μm.
Urethane resin particles (C-2) for slush molding were yielded in the same way as in Example 1 except that the particles (P-2) were used instead of the particles (P-1) in Example 1.

Example 3

Production of Urethane Resin Particles (C-3):
While a T K Pipe Line Homomixer (manufactured by PRIMIX Corporation) was driven at 3600 rpm, an oil phase in which the prepolymer (U-1) (100 parts) and the MEK ketimine compound (5.6 parts) were charged into a reaction vessel and then these components were mixed with each other, and an aqueous solution in which a polyvinyl alcohol (manufactured by Kuraray Co. , Ltd.) (5.3 parts) was dissolved as a dispersing agent were sent to the homomixer at flow rates of 100 kg/hour, and 400 kg/hour, respectively, to conduct dispersion. This mixture was shifted to a reaction vessel equipped with a thermostat, a stirrer and a nitrogen-blowing tube, and then the inside thereof was purged with nitrogen. While the mixture was stirred, the reactive components therein were caused to react with each other at 50° C. for 10 hours. After the termination of the reaction, the resultant was separated by filtration, and then dried to produce urethane fine particles (G-3). The fine particles (G-3) had a thermally softening temperature of 140° C., and a central particle diameter of 20 μm. The particles were put into a Henschel Mixer, and stirred at 40 m/sec. to granulate the fine particles (G-3). After 15 minutes from the start of the stirring, the temperature reached 140° C. At this stage, the driving was stopped to yield urethane resin particles (P-3). The (P-3) had an Mn of 25,000, and a central particle diameter of 180 μm.

In the same way as in Example 1 except that instead of the (P-1) in Example 1, the particles (P-3) were used, urethane resin particles (C-3) for slush molding were yielded.

Example 4

Production of Urethane Resin Particles (C-4):

Urethane fine particles (G-4) were yielded in the same way as in Example 3 except that instead of the MEK ketimine compound (5.6 parts), 1-4 butanediol (2.6 parts) was used. The fine particles (G-4) had a thermally softening temperature of 91° C., and a central particle diameter of 3 μm.

The particles were put into a Henschel Mixer, and stirred at 40 m/sec. to granulate the fine particles (G-4). After 15 minutes from the start of the stirring, the temperature reached 90° C. At this stage, the driving was stopped to yield urethane resin particles (P-4). The (P-4) had an Mn of 25,000, and a central particle diameter of 20 μm.

Urethane resin particles (C-4) for slush molding were yielded in the same way as in Example 1 except that instead of the (P-1) in Example 1, the particles (P-4) were used and further the processing that "the particles passed through a sieve having a mesh of 200 were removed" was omitted.

Example 5

Production of Urethane Resin Particles (C-5):

Urethane resin particles (P-5) were yielded in the same way as in Example 3 except that the period for driving the Henschel Mixer was changed to 25 minutes. The (P-5) had an Mn of 25,000, and a central particle diameter of 500 μm.

Urethane resin particles (C-5) for slush molding were yielded in the same way as in Example 1 except that instead of the (P-1) in Example 1, the particles (P-5) were used and further instead of the processing that "the mixture was passed through a sieve having a mesh of 48, and from the resultant, particles passed through a sieve having a mesh of 200 were then removed", a processing that "the mixture was passed through a sieve having a mesh of 26" was performed.

Example 6

Production of Urethane Resin Particles (C-6):

Into a reaction vessel were charged the prepolymer (U-2) (100 parts), and the MEK ketimine compound (4.1 parts), and the components were mixed with each other. Thereto was added 340 parts of an aqueous solution in which a dispersing agent (Sanspearl PS-8 (1.3 parts), manufactured by Sanyo Chemical Industries, Ltd.) and methyl ethyl ketone (dielectric constant: 15.5) (68 parts) were dissolved (content of the organic solvent in the aqueous solution: 20% by weight). An ultra disperser was used to mix these components with each other at a rotation number of 9000 rpm (peripheral speed: 15 m/s) for 1 minute. This mixture was shifted to a reaction vessel equipped with a thermostat, a stirrer and a nitrogen-blowing tube, and then the inside thereof was purged with nitrogen. While the mixture was stirred, the reactive components therein were caused to react with each other at 50° C. for 10 hours. After the termination of the reaction, the resultant was separated by filtration, and then dried to produce urethane resin particles (P-6). The (P-6) had an Mn of 18,000, and a central particle diameter of 143 μm.

In the same way as in Example 1 except that instead of the (P-1) in Example 1, the particles (P-6) were used, urethane resin particles (C-6) for slush molding were yielded.

Example 7

Production of Urethane Resin Particles (C-7):

While an apparatus, DISPAX-REACTOR (manufactured by IKA), was driven at 12000 rpm, an oil phase in which the prepolymer (U-1) (100 parts) and the MEK ketimine compound (5.6 parts) were charged into a reaction vessel and then these components were mixed with each other, and an aqueous solution in which a dispersing agent (a sodium salt of dodecyldiphenyl ether disulfonate) (5.3 parts) was dissolved were sent to this apparatus at flow rates of 100 kg/hour, and 400 kg/hour, respectively, to conduct the dispersion. This mixture was shifted to a reaction vessel equipped with a thermostat, a stirrer and a nitrogen-blowing tube, and then the inside thereof was purged with nitrogen. While the mixture was stirred, the reactive components therein were caused to react with each other at 50° C. for 10 hours. After the termination of the reaction, the resultant was separated by filtration, and then dried to produce urethane fine particles (G-7). The fine particles (G-7) had a thermally softening temperature of 141° C., and a central particle diameter of 3 μm. The particles were put into a Henschel Mixer, and stirred at 40 m/sec. to granulate the fine particles (G-7). After 15 minutes from the start of the stirring, the temperature reached 140° C. After the driving of the apparatus was continued for 15 minutes, the driving was stopped to yield urethane resin particles (P-7). The (P-7) had an Mn of 25,000, and a central particle diameter of 350 μm.

In the same way as in Example 1 except that instead of the (P-1) in Example 1, the particles (P-7) were used, urethane resin particles (C-7) for slush molding were yielded.

Example 8

Production of Urethane Resin Particles (C-8):

Into a reaction vessel were charged the prepolymer (U-2) (100 parts), and the MEK ketimine compound (4.1 parts), and the components were mixed with each other. Thereto was added 300 parts of an aqueous solution in which a dispersing agent (Sanspearl PS-8 (1.3 parts), manufactured by Sanyo Chemical Industries, Ltd.) was dissolved. An ultra disperser was used to mix these components with each other at a rotation number of 6000 rpm for 1 minute. This mixture was shifted to a reaction vessel equipped with a thermostat, a stirrer and a nitrogen-blowing tube, and then the inside thereof was purged with nitrogen. While the mixture was stirred, the reactive components therein were caused to react with each other at 50° C. for 10 hours. After the termination of the reaction, the resultant was separated by filtration, and then dried to produce urethane resin fine particles (G-8). The particles (G-8) had a thermally softening temperature of 140° C., and a central particle diameter of 40 μm. The particles were put into a Henschel Mixer, and stirred at 40 m/sec. to granulate the fine particles (G-8). After 15 minutes from the start of the stirring, the temperature reached 140° C. At this time, the driving was stopped to yield urethane resin particles (P-8). The (P-8) had an Mn of 25,000, and a central particle diameter of 110 μm.

In the same way as in Example 1 except that instead of the (P-1) in Example 1, the particles (P-8) were used, urethane resin particles (C-8) for slush molding were yielded.

Example 9

Production of Urethane Resin Particles (C-9):

Urethane resin particles (P-9) were yielded in the same way as in Example 1 except that the use amount of the tetrahydrofuran was changed to 34 parts (content of the organic solvent in the aqueous solution: 10% by weight). The (P-9) had an Mn of 25,000, and a central particle diameter of 120 μm.

In the same way as in Example 1 except that instead of the (P-1) in Example 1, the particles (P-9) were used, urethane resin particles (C-9) for slush molding were yielded.

Example 10

Production of Urethane Resin Particles (C-10):

Urethane fine particles (G-10) were yielded in the same way as in Example 7 except that the use amount of the dispersing agent (the sodium salt of dodecyldiphenyl ether disulfonate) was changed to 7.5 parts. The particles (G-10) had a thermally softening temperature of 141° C., and a central particle diameter of 2 μm. Furthermore, urethane resin particles (P-10) were yielded in the same way as in Example 7. The (P-10) had an Mn of 25,000, and a central particle diameter of 250 μm.

In the same way as in Example 1 except that instead of the (P-1) in Example 1, the particles (P-10) were used, urethane resin particles (C-10) for slush molding were yielded.

Example 11

Production of Urethane Resin Particles (C-11):

The following were mixed with 39.3 parts of 1,6-HG to prepare homogeneous glycol components: 243.5 parts of a polyester diol having an Mn of 1000 yielded from 1,4-BD, and adipic acid; 243.5 parts of a polyester diol having an Mn of 2600 yielded from 1,4-BD, ethylene glycol and adipic acid; and 324.7 parts of a polyester diol having an Mn of 1500 yielded from 1,6-HG and isophthalic acid. The glycol components were mixed with HDI, and the mixture was supplied at a flow rate ratio of 100:17.5 from a hopper of a biaxial extruder, the temperature of which was adjusted to about 190° C. The mixture was kneaded, and simultaneously resinified to yield a polyurethane resin.

The polyurethane resin yielded in the above-described step was put into a pelletizer. To 100 parts of the pelletized polyurethane were added 0.25 parts of Irganox 245 (manufactured by Ciba Specialty Chemicals Inc.) as an antioxidant, 0.15 parts of Tinuvin 213 (manufactured by Ciba Specialty Chemicals Inc.) as an ultraviolet absorbent, 0.15 parts of Tinuvin 765 (manufactured by Ciba Specialty Chemicals Inc.) as a light stabilizer, and 0.25 parts of SH 200-1,000CS (manufactured by Dow Corning Toray Co., Ltd.) as an internal releasing agent. The mixture was supplied from a hopper of a biaxial extruder, the temperature of which was adjusted to about 200° C., and kneaded to yield a polyurethane resin.

The polyurethane resin, to which the additives were added as described above, was cooled to −150° C. with liquid nitrogen, and then made into a fine powder by means of an impact pulverizer. In order to give fluidity thereto, 0.4 parts of a dusting powder "MP-1451" was added to 100 parts of the resin, and then these components were stirred and mixed with each other to cause the powder to adhere evenly onto the surface of the polyurethane resin. Next, the resultant was passed through a sieve having a mesh of 200 to yield urethane resin fine particles (G-11). The (G-11) had a thermally softening temperature of 110° C., and a central particle diameter of 50 μm. The particles were put into a Henschel Mixer, and stirred at 40 m/sec. to granulate the fine particles (G-11). After 15 minutes from the start of the stirring, the temperature reached 110° C. At this stage, the driving was stopped to yield urethane resin particles (P-11). The (P-11) had an Mn of 25,000, and a central particle diameter of 180 μm.

In the same way as in Example 1 except that instead of the (P-1) in Example 1, the particles (P-11) were used, urethane resin particles (C-11) for slush molding were yielded.

Example 12

Production of Urethane Resin Particles (C-12):

Into a reaction vessel were charged 100 parts of the prepolymer solution (U-3) and 5.6 parts of the MEK ketimine compound. Thereto was added 500 parts by weight of the dispersion medium (Y-1), and an ultra disperser was then used to mix these components at a rotation number of 12000 rpm (peripheral speed: 20 m/s) for 1 minute. This mixture was shifted to a reaction vessel equipped with a thermostat, a stirrer and a nitrogen-blowing tube. The inside of the vessel was purged with nitrogen, and then the reactive components therein were caused to react with each other at 50° C. for 10 hours while the mixture was stirred. After the termination of the reaction, the system was heated to 60° C. under reduced pressure to remove the solvent. After the removal of the solvent, the resultant was separated by filtration, and then dried to produce urethane fine particles (G-12).

The (G-12) had a central particle diameter of 7 μm, and a Cv of 91, and the urethane resin (D-12) had an SP value of 11.2 and a thermally softening temperature of 137° C.

Furthermore, to 100 parts of the (G-12) prepared as described above was dropwise added 5 parts of MEK (boiling point: 78° C.; difference between the SP value thereof and that of the urethane resin (D-12): 2.2) as a solvent (T) while the particles (G-12) were stirred. In this way, the slurry was made into an even state. Thereafter, while the slurry was stirred at a peripheral speed of 6.5 m/s by means of a high-speed mixer manufactured by Fukae Industries Co., Ltd., the temperature was raised to 81° C. Thereafter, the temperature was immediately cooled to 50° C. while the slurry was stirred at a peripheral speed of 1.0 m/s. The central particle diameter was measured. As a result, the central particle diameter was 50 μm. Thus, 5 parts of MEK were further sprayed thereon, and the temperature was raised to 81° C. This state was continued for 15 minutes. Thereafter, the temperature was immediately cooled to 50° C. under the slurry was stirred at a peripheral speed of 1.0 m/s. The central particle diameter was measured. As a result, the central particle diameter was 103 μm. Thus, the temperature was raised to 55° C., and the solvent was distilled off under reduced pressure. In this way, urethane resin particles (P-12) were yielded. The resultant (P-12) had a central particle diameter of 103 μm, and a Cv of 34.

In the same way as in Example 1 except that instead of the (P-1) in Example 1, the particles (P-12) were used, urethane resin particles (C-12) for slush molding were yielded.

Example 13

Production of Urethane Resin Particles (C-13):

Into a reaction vessel were charged 100 parts of the prepolymer solution (U-3) and 5.6 parts of the MEK ketimine compound. Thereto was added 340 parts by weight of the dispersion medium (Y-1), and an ultra disperser was then used to mix these components at a rotation number of 9000 rpm (peripheral speed: 15 m/s) for 1 minute. This mixture was shifted to a reaction vessel equipped with a thermostat, a stirrer and a nitrogen-blowing tube. The inside of the vessel was purged with nitrogen, and then the reactive components therein were caused to react with each other at 50° C. for 10 hours while the mixture was stirred. In this way, produced was a slurry (R-13) containing urethane resin fine particles (G-13).

The particles (G-13) had an average particle diameter of 22 µm, and a Cv of 70, and the urethane resin (D-13) had an SP value of 11.2 and a thermally softening temperature of 141° C.

To 180 parts of the (R-13) prepared as described above was added 20 parts of MEK (boiling point: 78° C.; difference between the SP value thereof and that of the urethane resin (D): 2.2) as a solvent (T). While the slurry was stirred at a peripheral speed of 15 m/s, the temperature was raised to 70° C. This state was continued for 1 hour. Thereafter, the solvent was distilled off under reduced pressure. The resultant was separated by filtration, washed and dried to yield urethane resin particles (P-13). The resultant (P-13) had a central particle diameter of 155 µm, and a Cv of 25.

In the same way as in Example 1 except that instead of the (P-1) in Example 1, the particles (P-13) were used, urethane resin particles (C-13) for slush molding were yielded.

Example 14

Production of Urethane Resin Particles (C-14):

Into a reaction vessel were charged 100 parts of the prepolymer solution (U-3) and 5.6 parts of the MEK ketimine compound. Thereto was added 340 parts by weight of the dispersion medium (Y-1), and an ultra disperser was used to mix these components at a rotation number of 7000 rpm (peripheral speed: 12 m/s) for 2 minutes. This mixture was shifted to a reaction vessel equipped with a thermostat, a stirrer and a nitrogen-blowing tube. The inside of the vessel was purged with nitrogen, and then the reactive components therein were caused to react with each other at 50° C. for 10 hours while the mixture was stirred. After the termination of the reaction, the system was heated to 60° C. under reduced pressure to remove the solvent. After the removal of the solvent, the resultant was separated by filtration, and then dried to produce urethane fine particles (G-14).

The (G-14) had an average particle diameter of 55 µm, and a Cv of 68, and the urethane resin (D-14) had an SP value of 11.2 and a thermally softening temperature of 142° C.

To 140 parts of the dispersion medium (Y-1) was dispersed 65 parts of the (G-14) prepared as described above while the medium (Y-1) was stirred, to prepare a slurry (R-14). To this slurry (R-14) was added 15 parts of THF (boiling point: 66° C.; difference between the SP value thereof and that of the urethane resin (D): 2.1) as a solvent (T). While the slurry was stirred at a peripheral speed of 1.0 m/s, the temperature was raised to 65° C. This state was continued for 3 hours. Thereafter, the solvent was distilled off under reduced pressure. The resultant was separated by filtration, washed and dried to yield urethane resin particles (P-14). The resultant (P-14) had a central particle diameter of 137 µm, and a Cv of 27.

In the same way as in Example 1 except that instead of the (P-1) in Example 1, the particles (P-14) were used, urethane resin particles (C-14) for slush molding were yielded.

Example 15

Production of Urethane Resin Particles (C-15):

To 100 parts of the urethane resin particles (P-1) yielded in Example 1 were added 1.0 part of a dibenzoic acid ester (H-1) (Sansoft EB300, manufactured by Sanyo Chemical Industries, Ltd., melting point: 0° C. or lower; boiling point: 300° C. or higher) of polyethylene glycol (polymerization degree: 2 to 10), and 1.0 part of dipentaerythritol pentaacrylate as additives to immerse the particles in the liquid at 70° C. for 1 hour. Thereto was added 3.0 parts of the pigment-dispersed resin particles (SE-1), and the resultant mixture was stirred in a Henschel Mixer at a rotation speed of 700 minutes$^{-1}$ for 1 minute (ratio of the particle diameter of the (P-15) to that of the (SE-1): 100:11). Next, the resultant was shifted to a Nauta Mixer. Thereinto were charged two kinds of internally-additive releasing agents {a dimethylpolysiloxane (0.06 parts) [KL45-10000, manufactured by Nippon Unicar Co., Ltd.], and a carboxyl-modified silicone (0.05 parts) [X-22-3710, manufactured by Shin-Etsu Chemical Co., Ltd.]}, and then these components were mixed with each other for 1 hour. Thereafter, the mixture was cooled to room temperature. Finally, thereto was charged a blocking inhibitor (0.5 parts) [Ganz Pearl PM-0305, manufactured by Ganz Chemical Co., Ltd.], and the components were mixed with each other. The mixture was passed through a sieve having a mesh of 48. From the resultant, particles passed through a sieve having a mesh of 200 were then removed to yield urethane resin particles (C-15).

Comparative Example 1

Production of Urethane Resin Particles (C'-1):

Into a reaction vessel were charged the prepolymer solution (U-1) (100 parts) and the MEK ketimine compound (5.6 parts), and these components were mixed with each other. Thereto was added 300 parts of an aqueous solution in which a dispersing agent (Sanspearl PS-8 (1.3 parts) manufactured by Sanyo Chemical Industries, Ltd.) were dissolved. An ultra disperser manufactured by Yamato Scientific Co., Ltd. was then used to mix these components at a rotation number of 5000 rpm for 1 minute. This mixture was shifted to a reaction vessel equipped with a thermostat, a stirrer and a nitrogen-blowing tube. The inside of the vessel was purged with nitrogen, and then the reactive components therein were caused to react with each other at 50° C. for 10 hours while the mixture was stirred. After the termination of the reaction, the resultant was separated by filtration, and then dried to produce urethane resin particles (P'-1). The (P'-1) had an Mn of 25,000, and a central particle diameter of 150 µm.

In the same way as in Example 1 except that instead of the (P-1) in Example 1, the particles (P'-1) were used, urethane resin particles (C'-1) for slush molding were yielded.

Comparative Example 2

Production of Urethane Resin Particles (C'-2):

The following were mixed with 1,6-HG (39.3 parts) to prepare homogeneous glycol components: a polyester diol (243.5 parts) having an Mn of 1000 yielded from 1,4-BD, and adipic acid; a polyester diol (243.5 parts) having an Mn of 2600 yielded from 1,4-BD, ethylene glycol, and adipic acid; and a polyester diol (324.7 parts) having an Mn of 1500 yielded from 1,6-HG and isophthalic acid. The glycol components were mixed with HDI, and the mixture was supplied at a flow rate ratio of 100:17.5 from a hopper of a biaxial extruder, the temperature of which was adjusted to about 190° C. The mixture was kneaded, and simultaneously resinified to yield a polyurethane resin.

The polyurethane resin yielded in the above-described step was put into a pelletizer. To 100 parts of the pelletized polyurethane were added 0.25 parts of Irganox 245 (manufactured by Ciba Specialty Chemicals Inc.) as an antioxidant, 0.15 parts of Tinuvin 213 (manufactured by Ciba Specialty Chemicals Inc.) as an ultraviolet absorbent, 0.15 parts of Tinuvin 765 (manufactured by Ciba Specialty Chemicals Inc.) as a light stabilizer, and 0.25 parts of SH 200-1,000CS (manufactured by Dow Corning Toray Co., Ltd.) as an internal releasing agent. The mixture was supplied from a hopper of a biaxial extruder, the temperature of which was adjusted to about 200° C., and kneaded to yield a polyurethane resin.

The polyurethane resin, to which the additives were added as described above, was cooled to about −150° C. with liquid nitrogen, and then made into a fine powder by means of an impact pulverizer. In order to give fluidity thereto, 0.4 parts of a dusting powder "MP-1451" was added to 100 parts of the resin, and then these components were stirred and mixed with each other to cause the powder to adhere evenly onto the surface of the polyurethane resin. Next, the resultant was passed through a sieve having a mesh of 48. Furthermore, particles passed through a sieve having a mesh of 200 were removed therefrom to yield polyurethane resin particles (P'-2). The (P'-2) had a central particle diameter of 180 μm.

In the same way as in Example 1 except that instead of the (P-1) in Example 1, the particles (P'-2) were used, urethane resin particles (C'-2) for slush molding were yielded.

Comparative Example 3

Production of Vinyl Chloride Resin Particles (C'-3):

Into a Henschel Mixer were charged 100 parts of a vinyl chloride resin (ZEST 1000Z, manufactured by Shin Dai-Ichi Vinyl Corporation), 2.7 parts of the pigment-dispersed liquid (HE-1), 5 parts of epoxidized soybean oil (O-130P, manufactured by Adeka Corporation), 5 parts of hydrotalcite (Alcamizer-5, manufactured by Kyowa Chemical Industry Co., Ltd.), 1 part of zeolite (Mizukalizer DS, manufactured by Mizusawa Industrial Chemical, Ltd.), and 0.3 parts of stearoylbenzoylmethane (Karenz DK-1, manufactured by Showa Denko K.K.). These components were mixed each other at a rotation number of 700 minutes$^{-1}$. When the temperature of the mixture rose to 80° C., 80 parts of a plasticizer (Trimex NSK, manufactured by Kao Corporation) were added thereto. Thereafter, these components were mixed with each other until the plasticizer was absorbed to the vinyl chloride resin so that the mixture turned to a mixture of dry and fine particles. In this way, vinyl chloride resin particles (C'-3) were yielded.

Comparative Example 4

Production of Urethane Resin Particles (C'-4):

Urethane fine particles (G'-4) were yielded in the same way as in Example 7 except that the use amount of the dispersing agent (the sodium salt of dodecyldiphenyl ether disulphate) was changed to 11.0 parts. The fine particles (G'-4) had a central particle diameter of 1 μm. In the same way as in Example 7, urethane resin particles (P'-4) were yielded. The (P'-4) had an Mn of 25,000, and a central particle diameter of 190 μm.

In the same way as in Example 1 except that instead of the (P-1) in Example 1, the particles (P'-4) were used, urethane resin particles (C'-4) for slush molding were yielded.

Comparative Example 5

Production of Urethane Resin Particles (C'-5):

Urethane resin particles (P'-5) were yielded in the same way as in Example 5 except that the peripheral speed of the Henschel Mixer was changed to 0.4 m/s. The (P'-5) had an Mn of 25,000, and a central particle diameter of 180 μm.

In the same way as in Example 1 except that instead of the (P-1) in Example 1, the particles (P'-5) were used, urethane resin particles (C'-5) for slush molding were yielded.

Production of Resin Molded Products (Q):

Slush molding was performed as follows: resin particles (C1) to (C15) and (C'1) to (C'5), for slush molding, according to Examples 1 to 15, and Comparative Examples 1 to 5 were filled into respective Ni-electrocast molds which were each a mold having a crimped pattern and heated beforehand to 230° C. After 10 seconds, an extra of the resin powdery composition was discharged from each of the molds. The mold was naturally cooled for 60 seconds, and then cooled with water. The resultant was then removed from the Ni-electrocast mold. In this way, resin molded bodies (Q1) to (Q15) and (Q'1) to (Q'5) were yielded which were each a skin body.

In accordance with methods described below, evaluations were made about individual physical properties of each of the urethane resin particles (C), the number of particles (F) which were each an aggregate of the pigment particles (E), the discoloration, and the skin bodies. The results are shown in Tables 1 and 2.

TABLE 1

|  |  | Example 1 | Example 2 | Example 3 | Example 4 | Example 5 |
|---|---|---|---|---|---|---|
| Urethane resin (D) |  |  |  |  |  |  |
| Urea group concentration | % by weight | 2.8 | 2.8 | 2.8 | 0 | 2.8 |
| Total of urethane group concentration + urea group concentration | % by weight | 11.4 | 11.4 | 11.4 | 11.9 | 11.4 |
| Melting point | ° C. | 215 | 215 | 215 | 126 | 215 |
| Glass transition temperature | ° C. | −43 | −43 | −43 | −55 | −43 |
| Urethane resin particles (C) |  |  |  |  |  |  |
| Central particle diameter | μm | 151 | 180 | 180 | 20 | 500 |
| Shape factor SF1 |  | 188 | 170 | 160 | 120 | 200 |
| Shape factor SF2 |  | 152 | 148 | 138 | 131 | 150 |

TABLE 1-continued

|  |  |  |  |  |  |  |
|---|---|---|---|---|---|---|
| Ratio of 90% particle diameter to 10% particle diameter |  | 2.7 | 3.0 | 2.9 | 3.0 | 3.0 |
| Evaluation results |  |  |  |  |  |  |
| Flow-down period | Seconds | 17.5 | 18.0 | 17.0 | 20.0 | 11.2 |
| Powder fluidity |  | ○ | ○ | ○ | ○ | ○ |
| Particles (F) each of which is aggregate | The number/100-particles | 0.25 | 0.50 | 0.25 | 0.00 | 1.00 |
| Discoloration |  | ○ | ○ | ○ | ○ | ○ |
| Resin molded body (Q) |  |  |  |  |  |  |
| Thickness | mm | 0.5 | 0.5 | 0.5 | 1.2 | 0.8 |
| Evaluation of pinholes |  | ○ | ○ | ○ | ○ | ○ |

|  | Example 6 | Example 7 | Example 8 | Example 9 | Example 10 |
|---|---|---|---|---|---|
| Urethane resin (D) |  |  |  |  |  |
| Urea group concentration | 2.6 | 2.8 | 2.6 | 2.8 | 2.8 |
| Total of urethane group concentration + urea group concentration | 10.6 | 11.4 | 10.6 | 11.4 | 11.4 |
| Melting point | 209 | 215 | 209 | 215 | 215 |
| Glass transition temperature | −39 | −43 | −39 | −43 | −43 |
| Urethane resin particles (C) |  |  |  |  |  |
| Central particle diameter | 143 | 350 | 110 | 120 | 250 |
| Shape factor SF1 | 170 | 110 | 180 | 101 | 110 |
| Shape factor SF2 | 151 | 199 | 120 | 120 | 240 |
| Ratio of 90% particle diameter to 10% particle diameter | 2.8 | 2.7 | 3.0 | 2.0 | 3.0 |
| Evaluation results |  |  |  |  |  |
| Flow-down period | 16.8 | 13.0 | 18.0 | 14.5 | 13.0 |
| Powder fluidity | ○ | ○ | ○ | ○ | ○ |
| Particles (F) each of which is aggregate | 0.50 | 0.00 | 0.75 | 1.00 | 1.00 |
| Discoloration | ○ | ○ | ○ | ○ | ○ |
| Resin molded body (Q) |  |  |  |  |  |
| Thickness | 0.7 | 0.6 | 0.7 | 0.5 | 0.5 |
| Evaluation of pinholes | ○ | ○ | ○ | ○ | ○ |

TABLE 2

|  |  | Example 11 | Example 12 | Example 13 | Example 14 | Example 15 |
|---|---|---|---|---|---|---|
| Urethane resin (D) |  |  |  |  |  |  |
| Urea group concentration | % by weight | 0 | 1.0 | 1.0 | 1.0 | 2.8 |
| Total of urethane group concentration + urea group concentration | % by weight | 10.5 | 9.7 | 9.7 | 9.7 | 11.4 |
| Melting point | ° C. | 175 | 195 | 195 | 195 | 215 |
| Glass transition temperature | ° C. | −45 | −39 | −39 | −39 | −43 |
| Urethane resin particles (C) |  |  |  |  |  |  |
| Central particle diameter | μm | 200 | 103 | 155 | 137 | 151 |
| Shape factor SF1 |  | 200 | 190 | 185 | 190 | 188 |
| Shape factor SF2 |  | 240 | 180 | 220 | 210 | 152 |
| Ratio of 90% particle diameter to 10% particle diameter |  | 3.0 | 2.9 | 2.8 | 2.9 | 2.7 |

TABLE 2-continued

| Evaluation results | | | | | | |
|---|---|---|---|---|---|---|
| Flow-down period | Seconds | 19.5 | 16.0 | 18.0 | 18.0 | 17.0 |
| Powder fluidity | | ○ | ○ | ○ | ○ | ○ |
| Particles (F) each of which is aggregate | The number/100-particles | 0.75 | 0.75 | 1.00 | 0.75 | 0.25 |
| Discoloration | | ○ | ○ | ○ | ○ | ○ |
| Resin molded body (Q) | | | | | | |
| Thickness | mm | 1.0 | 0.8 | 0.8 | 0.8 | 0.7 |
| Evaluation of pinholes | | ○ | ○ | ○ | ○ | ○ |

| | Comparative Example 1 | Comparative Example 2 | Comparative Example 3 | Comparative Example 4 | Comparative Example 5 |
|---|---|---|---|---|---|
| Urethane resin (D) | | | | | |
| Urea group concentration | 2.8 | 0 | 0 | 2.8 | 2.8 |
| Total of urethane group concentration + urea group concentration | 11.4 | 10.5 | 0 | 11.4 | 11.4 |
| Melting point | 215 | 175 | 145 | 215 | 215 |
| Glass transition temperature | −43 | −45 | −50 | −43 | −43 |
| Urethane resin particles (C) | | | | | |
| Central particle diameter | 150 | 180 | 180 | 190 | 180 |
| Shape factor SF1 | 125 | 210 | 130 | 200 | 220 |
| Shape factor SF2 | 110 | 240 | 120 | 260 | 220 |
| Ratio of 90% particle diameter to 10% particle diameter | 3.5 | 6.5 | — | 2.7 | 4.0 |
| Evaluation results | | | | | |
| Flow-down period | 13.0 | 24.6 | 17.3 | 14.0 | 24.0 |
| Powder fluidity | ○ | x | ○ | ○ | x |
| Particles (F) each of which is aggregate | 2.25 | 0.75 | 0.50 | 1.50 | 0.75 |
| Discoloration | x | ○ | ○ | x | ○ |
| Resin molded body (Q) | | | | | |
| Thickness | 0.5 | 1.0 | 1.2 | 1.0 | 0.5 |
| Evaluation of pinholes | ○ | x | ○ | ○ | x |

<Shape Factors SF1 and SF2>

In the measurement of the shape factors SF1 and SF2, the particles were photographed under 300 magnifications through a scanning electron microscope (S-800, manufactured by Hitachi Ltd.) when the particles had a central particle diameter of 20 μm or more and less than 40 μm; under 160 magnifications when the particles had a central particle diameter of 40 μm or more and less than 75 μm; under 80 magnifications when the particles had a central particle diameter of 75 μm or more and less than 150 μm; under 40 magnifications when the particles had a central particle diameter of 150 μm or more and less than 300 μm; and under 25 magnifications when the particles had a central particle diameter of 300 μm or more. From the resultant images (resolution: 128q0×1024 pixels), 80 particles were selected at random. The selected particles were introduced into an image analyzer (LUSEX3, manufactured by Nireco Corporation) to make an analysis. In this way, the average SF1 value, and the average SF2 value were calculated out.

<Central Particle Diameter>

A Microtrac HRA Particle Size Analyzer 9320-X100 (manufactured by Nikkiso Co., Ltd.) was used to measure the below-sieve 50% particle diameter by a laser-light scattering method, and the resultant value was defined as the central particle diameter thereof.

<Ratio of 90% Particle Diameter to 10% Particle Diameter>

A Microtrac HRA Particle Size Analyzer 9320-X100 (manufactured by Nikkiso Co., Ltd.) was used to measure the below-sieve 90% particle diameter, and the below-sieve 10% particle diameter by a laser light scattering method, and then the ratio of the 90% particle diameter to the 10% particle diameter was calculated out.

<Glass Transition Temperature>

For the glass transition temperature of the resin, a dynamic viscoelastometer, Rheogel-E4000 manufactured by UBM, was used to measure the dynamic viscoelasticity while the temperature of the system was raised at a constant rate under conditions described below. The temperature of the top of a peak of the loss modulus E" was defined as the glass transition temperature.

Measuring conditions:
Frequency: 10 Hz
Temperature range: −90 to 140° C., and
Temperature-raising rate: 5° C./minute <Melting Point>

A flow tester, CFT-500 manufactured by SHIMADU CORPORATION, was used to raise the temperature of the resin at a constant rate under conditions described below, and the temperature at which the outflow amount turned to ½ of the total amount was defined as the melting point.

Load: 5 kg
Die: 0.5 mmφ–1 mm
Temperature-raising rate: 5° C./minute

<Flow-Down Period>

A bulk density meter (in accordance with JIS-K6720) manufactured by Tsutsui Scientific Instruments Co., Ltd. was used to measure a period when 100 cm³ of the material flowed down through a funnel. The resultant value was used as an index of the powder fluidity. Those having a flow-down period of 20 seconds or less were judged to be acceptable about powder fluidity.

<Number of Particles (F) Which were Each Aggregate of Pigment Particles (E)>

A microscope was used to observe, under 100 magnifications, the surfaces of the resin particles, the total number of the particles being 400. On a monitor in which an image thereof was projected under 100 magnifications, a count was made about the number of particles (F) observed with the naked eye, the particles (F) being each an aggregate of the pigment particles (E).

<Discoloration>

The temperature of the front surface of an A4-size iron plate put on a hot plate was set to 250° C. Thereafter, 50 g of the resultant resin particles was put onto the plate. In order to make the film thickness of the particles even, the surface was leveled. After 90 seconds therefrom, the system was put into a water bath having a temperature of 25° C. to be cooled. The leveled resin film was peeled from the iron plate. From the film, a test piece was cut off which had a width of about 40 mm and a length of about 200 mm. The piece was attached to a plane abrasion tester (manufactured by Suga Test Instruments Co., Ltd.; model No.: FR-T), and its abrader was covered with a white cotton cloth, and then the cloth was fixed thereto. The load of the abrader was set to 300 g. The abrader was reciprocated 100 times on the test piece, and then the test piece was evaluated about discoloration. When the white cotton cloth was not colored, the test piece was estimated to be good (○). When the cloth was colored, the test piece was estimated to be bad (×).

<Pinhole Resistance>

The surface of each of the resultant molded bodies (Q) was observed with a microscope (under 10 magnifications), and then a situation as to whether or not pinholes were generated was examined. When the body had 20 or less pinholes in its area of 10 cm×10 cm, the body was estimated to be good (○) about pinhole resistance.

In Tables 1 and 2 are shown the results of the above-described evaluations. In general, the fluidity of a powder depends on the central particle diameter and the particle shape thereof. A comparison of Example 3 with Comparative Example 3 has made it clear that when the respective central particle diameters thereof are equivalent to each other, the urethane resin shows powder fluidity equivalent to that of the vinyl chloride resin particles although the urethane resin has a larger shape factor SF1. Moreover, in the urethane resin particles of the present invention, the generation amount of the particles (F), which are each a pigment-aggregate, is very small; thus, when the present particles are used as a material for molding, the material is good in color-developability, and makes it possible to decrease the amount of alien substances. Furthermore, the present particles are good in the performance of dispersing a pigment ; thus, even when the molded body is wiped with a cloth or some other, the shift of the color or some other defect is hardly generated. Thus, the molded body is a high-quality molded body.

When the urethane resin particles of the present invention for slush molding are used to perform slush molding, a skin body is obtained which is a high-quality molded body in which inconveniences such as pinholes and underfill are hardly caused.

Industrial Applicability

The urethane resin particles of the present invention for slush molding are excellent in power fluidity, thermal meltability, flexibility and endurance; thus, the particles can be used suitably as a material useful for slush molding.

The invention claimed is:

1. Urethane resin particles (C) for slush mold, comprising; urethane resin particles (P) of a urethane resin (D), and pigment particles (E) consisting of a pigment,
wherein the pigment particles (E) adhere onto the surfaces of the urethane resin particles (P),
wherein the urethane resin particles (C) have a shape factor SF1 of 101 to 200, a shape factor SF2 of 120 to 240, and a central particle diameter of 20 to 500 μm.

2. The resin particles (C) according to claim 1, which are granulated.

3. The resin particles (C) according to claim 1, wherein the ratio of the 90% particle diameter to the 10% particle diameter is from 2.0 to 3.0.

4. The resin particles (C) according to claim 1, wherein the urethane resin (D) has a concentration of urea groups of 0.5 to 10% by weight, a total of the concentration of urethane groups and that of the urea groups of 4 to 20% by weight, a melting point of 160 to 260° C. and a glass transition temperature of −65 to 0° C.

5. The resin particles (C) according to claim 1, wherein the urethane resin (D) is a thermoplastic urethane resin yielded by causing an isocyanate group-terminated urethane prepolymer (a) derived from an aliphatic diisocyanate (a1), a monool (a2), a high molecular weight diol (a3) having a number-average molecular weight of 500 to 10,000, and a low molecular weight diol (a4) if necessary to react with an alicyclic diamine and/or an aliphatic diamine (b).

6. The resin particles (C) according to claim 1, wherein aggregation of the pigment particles are hardly generated such that one piece or less of an aggregate of the pigment particles (E) having a particle diameter of 20 to 140 μm is included per one hundred of the urethane resin particles (P).

7. The resin particles (C) according to claim 1, further comprising an organic compound (H),
wherein the pigment (E) and the organic compound (H) form a pigment-dispersed liquid (HE) in which the pigment particles (E) are dispersed in the organic compound (H),
wherein the organic compound (H) has a melting point of 0° C. or lower and a boiling point of 170° C. or higher, and contains in the molecule thereof at least one ester group,
wherein the pigment-dispersed liquid (HE) adhere onto the surfaces of the urethane resin particles (P).

* * * * *